United States Patent
McDonald

[11] Patent Number: 6,103,332
[45] Date of Patent: Aug. 15, 2000

[54] FOLDED SHEET MEANS

[76] Inventor: George Wallace McDonald, Mon Cachet, Rue de la Cache, Castel, Guernsey, Channel Island, United Kingdom

[21] Appl. No.: 08/647,918
[22] PCT Filed: Apr. 22, 1994
[86] PCT No.: PCT/GB94/00865
   § 371 Date: Feb. 18, 1997
   § 102(e) Date: Feb. 18, 1997
[87] PCT Pub. No.: WO94/25286
   PCT Pub. Date: Nov. 10, 1994

[30] Foreign Application Priority Data

Apr. 22, 1993 [GB] United Kingdom ............ 9308376
Oct. 25, 1993 [GB] United Kingdom ............ 9321961

[51] Int. Cl.$^7$ ................................................ G09B 29/04
[52] U.S. Cl. ........................... 428/99; 281/2; 281/5; 281/31; 283/34; 283/106; 428/43; 428/77; 428/121; 428/130; 428/131; 428/192
[58] Field of Search .................. 428/99, 131, 43, 428/121, 77, 130, 192; 283/34, 106; 281/2, 5, 31

[56] References Cited

U.S. PATENT DOCUMENTS

| | | | |
|---|---|---|---|
| 2,532,132 | 11/1950 | Vogel | 40/124 |
| 4,606,553 | 8/1986 | Nickerson | 281/5 |
| 4,673,197 | 6/1987 | Shtipelman | 283/34 |

FOREIGN PATENT DOCUMENTS 619023  3/1949  United Kingdom .

Primary Examiner—Nasser Ahmad
Attorney, Agent, or Firm—Piper Marbury Rudnick & Wolfe

[57] ABSTRACT

Folded sheet means ($20^1$, 10) (e.g. substantially one-half or one-third of credit card size) (e.g. in the form of a kit of parts) comprises a sheet ($22^1$, 12) of paper or like material with a first set of concertina folds ($26^1$, 14) and a second set of concertina folds ($28^1$, 16) transverse to the first set, at which folds ($26^1$, $28^1$, 14, 16) the sheet ($22^1$, 12) can be folded and unfolded, connection means ($106^1$, 52) adapted to serve as or as part of means for releasably connecting between the folded sheet means ($20^1$, 10) and another object, and holding means ($24^1$, 22, 24) adapted for releasably holding the folded sheet means folded. Said holding means comprises an envelope or other container ($24^1$), said sheet ($22^1$) being adapted to be retained therein, e.g. with the aid of friction and/or at least one inwardly directed lip ($34^1$). The folded sheet material ($22^1$) may be (e.g. removably) in a carrier ($96^1$) movable into and out from the container ($24^1$). A tail ($106^1$) suitable for connection to a key-ring, luggage or other portable object is provided, e.g. on the carrier ($96^1$). The container ($24^1$) may comprise two sheet-like portions ($40^1$, $42^1$) hinged together and adapted to be releasably fastened together about the folded sheet ($22^1$). Two stiff portions (18, 20) are in diagonally opposite corners respectively of the sheet (12) when it is unfolded, and said holding means comprise a releasable connection (22), e.g. two tongues (26, 28) extending from one of said stiff portions (18) inwardly thereof in opposite directions. Part or all of the connection means (522, 523, 662) may be provided in common with part or all of the holding means (522, 523, 662). The folded sheet means (10) may have a back portion (138) provided with releasable self-adhesive material for attaching it to a holding surface (107) and a front portion (208) adapted for grasping and opening the sheet (12).

24 Claims, 8 Drawing Sheets

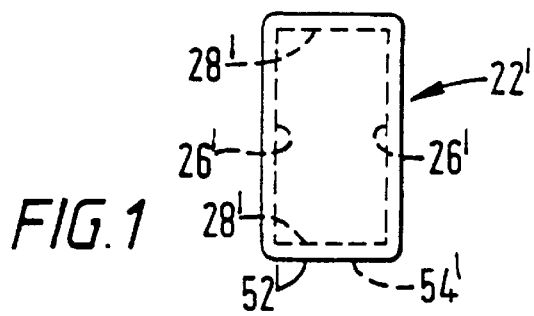
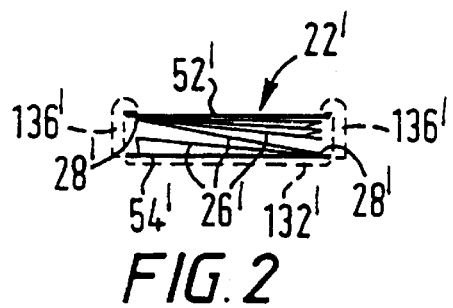
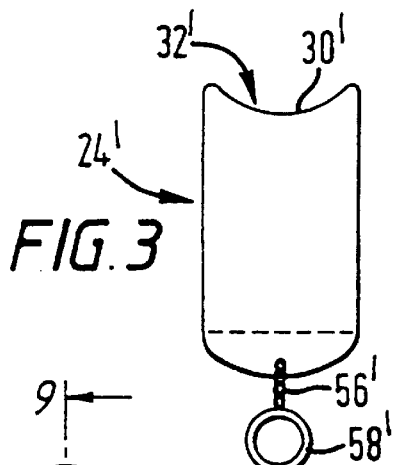
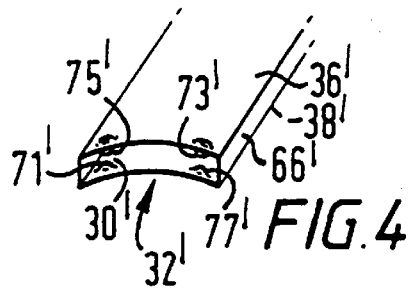
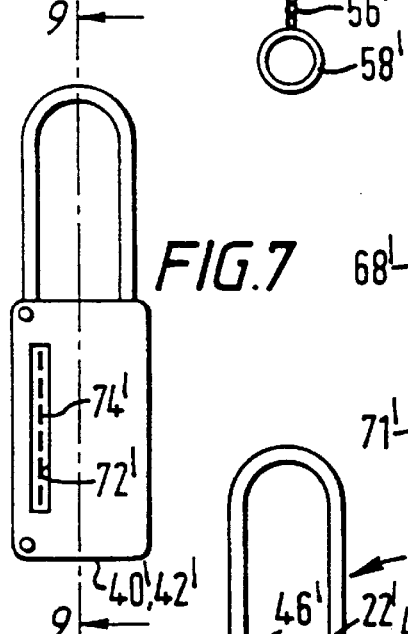
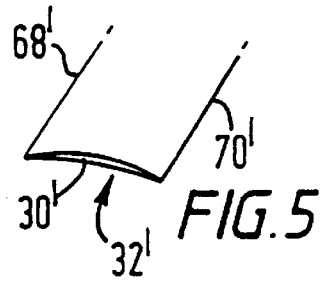
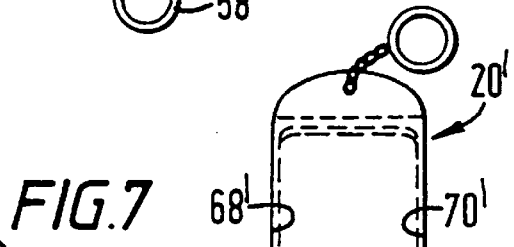
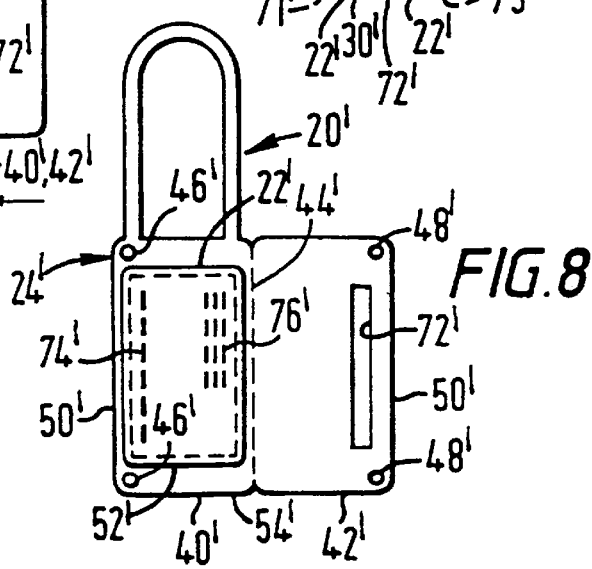
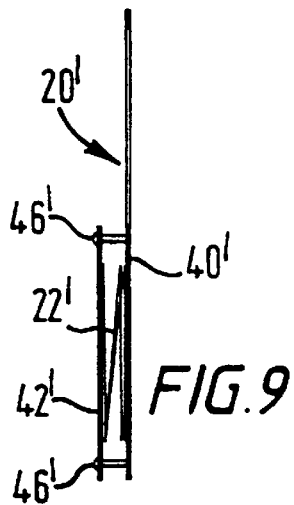

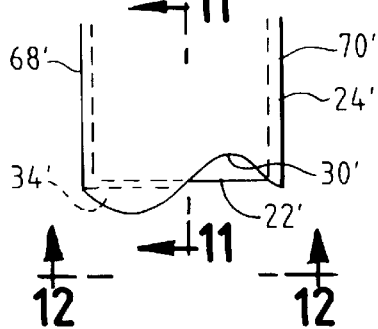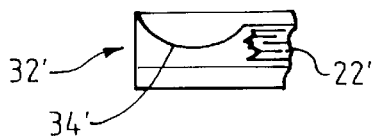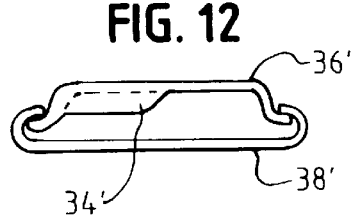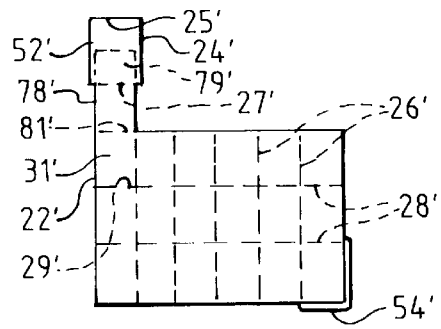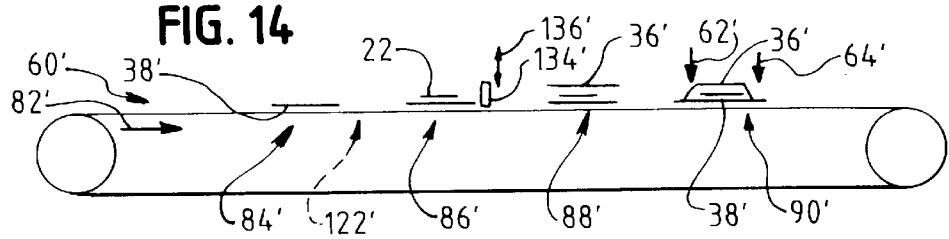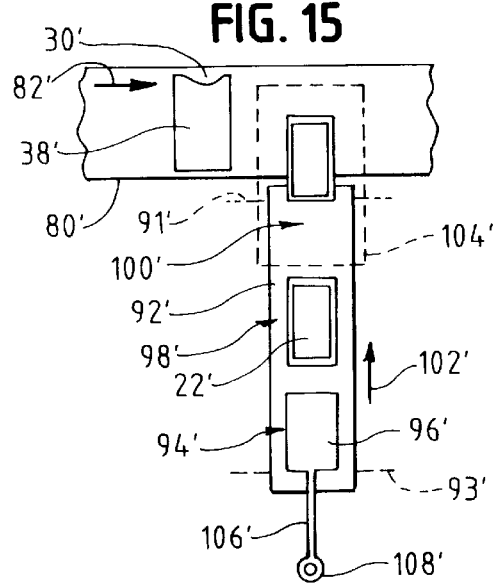

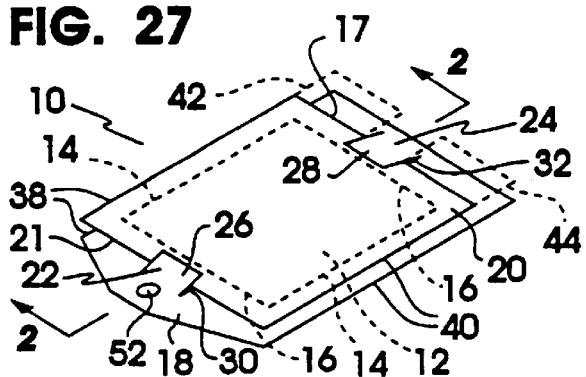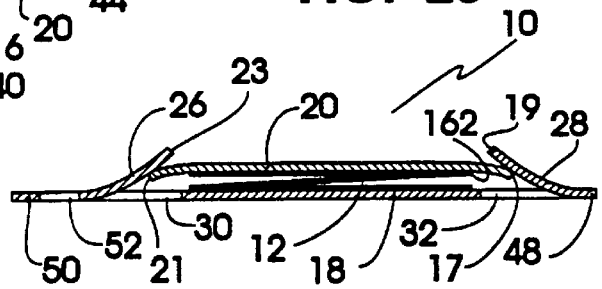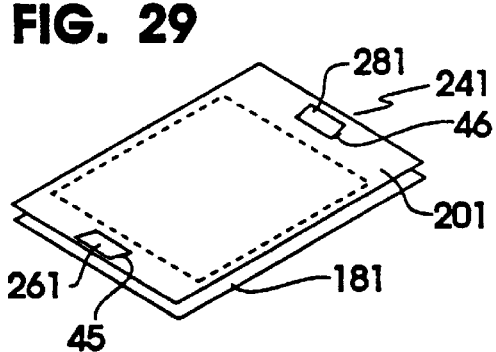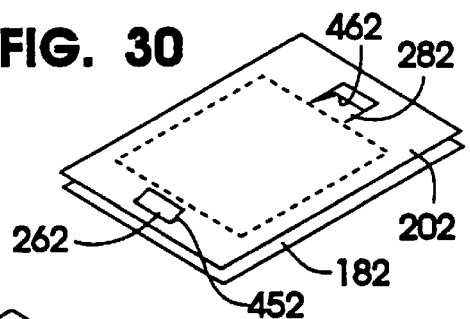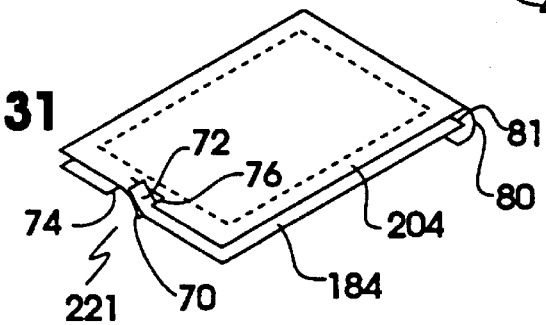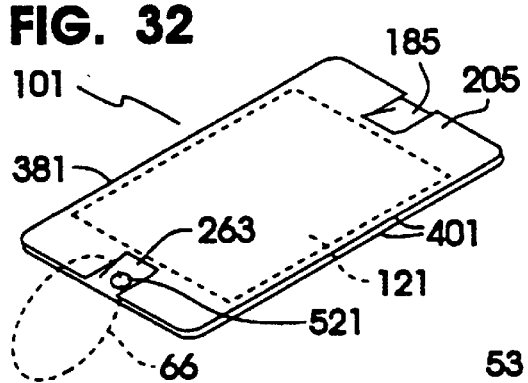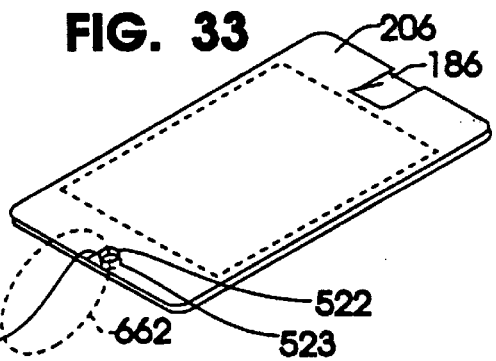

FOLDED SHEET MEANS

BACKGROUND

This invention relates to folded sheet means.

Folded sheet means are known from the present inventor's previous PCT patent specification WO87/04284 which have the advantages and operate in the manner indicated therein. As exemplified therein, a sheet of paper or like material is folded with a first set of concertina folds and, when so folded, is folded with a further set of two concertina folds transverse to the first set. The sheet is provided, at two diagonally opposite coners, with a stiff portion of plastics material having the shape and size of a credit card. These portions lie outside the sheet when folded and enable it to be opened completely, very readily and in many cases with only one hand, and closed (refolded) almost as easily.

There is a demand for a method of providing a large quantity of information in a small space, reliably secure against being easily lost or mislaid. To fulfil such needs, there have been proposed attachments for key-rings, e.g. with a rolled up sheet of paper enclosed in a small cylinder with a screw cap and having one end provided with a suitable connection for a key-ring. Such attachments do not give ready and speedy access to the information and, further, the quantity of information is severely limited because of the bulk of the cylinder.

THE INVENTION

The present inventor has realised that the said demand can be coupled with a folded sheet, e.g. that mentioned in his aforesaid previous patent specification. The invention consists in folded sheet means as claimed in claim 1. There can also be provided the features of claims 2 to 22. Examples are: use in the pocket and use on a drawing board.

List of Features

Attention is drawn to the following list of features, though they are not to be regarded as necessarily important features or all of the important features of this disclosure.

1. Sheet material means comprising an envelope or like container and sheet material to be contained therein, characterized in that the sheet material has a first set of concertina folds and transverse to these a second set of folds and fits inside the container to be retained therein with the aid of friction or the like.

2. Means comprising an envelope or like container and sheet material to be contained therein, characterized in that the sheet material has a first set of concertina folds and transverse to these a second set of folds and fits inside the container to be retained therein with the aid of friction and/or at least one mechanical retaining portion of the container and/or springiness of the sheet when folded up due to its mutually transverse sets of folds.

3. Means comprising an open-ended envelope or like container and sheet material to be contained therein, characterized in that the container is open at least at one end and the sheet material has a first set of concertina folds and transverse to these a second set of folds and fits closely inside the container to be retained therein with the aid of the springiness of the sheet when folded up due to its mutually transverse sets of folds.

4. The second set of folds consists of a single fold.

5. The second set of folds consists of a set of concertina folds.

6. The first set of folds comprises an odd number of folds and the second set of folds comprises an even number of folds.

7. The container has a cut-out shape at its open end to facilitate grasping and withdrawing from it the folded sheet.

8. The container has at least one inwardly directed lip to facilitate retaining the folded sheet therein.

9. The container has the form of two sheets welded or otherwise fastened together peripherally.

10. The container comprises two sheet-like portions hinged together and releasably fastened together by said at least one mechanical retaining portion to aid in retaining the folded sheet material in said container.

11. Said at least one mechanical retaining portion comprises at least two press-stud means spaced apart along an edge of the container opposite the hinge.

12. The folded sheet material has a first set of concertina folds and transverse to these a second set of concertina folds and is provided with a stiff portion, at an outer segment of the said folded sheet material when folded, which segment is at one of the diagonally opposite coners of the sheet material when unfolded.

13. The folded sheet material is provided with two stiff portions, one at each of the outer segments of the said folded sheet material when folded, which segments are at diagonally opposite coners of the sheet material when unfolded.

14. A said stiff portion is provided by the container.

15. The folded sheet means includes a carrier for the folded sheet material, the carrier being movable into and out from the container.

16. The carrier has one or more openings to facilitate removal of the folded sheet from the carrier.

17. The folded sheet means is adapted to limit the extent of relative withdrawal of the carrier from the container.

18. The carrier is provided with a tail suitable for connection to a key-ring, luggage or other portable object.

19. The sheet material is provided with a tail suitable for connection to a key-ring, luggage or other portable object.

20. The tail is sufficiently stiff to be self-supporting.

21. The folded sheet means is substantially of credit card size, i.e. 8.5 cm by 5.35 cm (or 3.4 in by 2.15 in) ±10%.

22. The folded sheet means is substantially one-third of credit card size, i.e. 2.8 cm by 5.35 cm (or 1.1 in by 2.15 in) ±20%.

23. The folded sheet means comprises attachment means and is suitable for attaching to a key-ring, luggage or other portable object.

24. The folded sheet means are in the form of a kit of parts comprising said container and said folded sheet material (whether or not the sheet material is actually folded up).

25. Apparatus for producing the folded sheet means, comprising means to locate two sheet-like outer portions for the container with said folded sheet material sandwiched between them, and peripherally fasten such portions together.

26. Apparatus for producing the folded sheet means, comprising means to assemble said container and a carrier carrying said folded sheet.

27. The carrier is provided with a tail sufficiently stiff to be self-supporting and the apparatus is adapted to insert the carrier tail-first into the container.

28. A process for producing the folded sheet means, characterized in that two sheet-like portions of the container are located with said folded sheet material sandwiched between them and such portions are then peripherally fastened together.

29. The process, in which a carrier for said folded sheet is assembled with said container.

30. The process, in which the carrier has a tail sufficiently stiff to be self-supporting and is inserted tail-first into the container.

31. Sheet material means comprising sheet material having a first set of concertina folds and, so as to be transverse to these when the sheet material is folded with these folds, a second set of concertina folds, the sheet material having two diagonally opposite segments which are at or near diagonally opposite coners of the sheet material and are defined by fold/s and/or edge/s thereof, characterized in that one of the segments is adapted for grasping and opening the sheet material and the opposite segment is provided with self-adhesive material for attaching it to a holding surface.

32. The self-adhesive material extends over substantially the whole area of said opposite segment.

33. Said one segment is provided with a stiff portion extending over substantially the whole of that segment for the purpose of grasping and opening the sheet material.

34. Said first set of folds comprises an odd number of folds and said second set of folds comprises an even number of folds.

35. Folded sheet means, comprising a sheet of paper or like material with a first set of concertina folds and a second set of folds transverse to the first set, the sheet being provided with two stiff portions, one of the stiff portions in the region of a corner of the sheet when it is unfolded and the other stiff portion on the opposite side of the sheet when it is folded with both sets of folds, characterized in that it comprises connection means adapted to serve for at least two connections, of which one is releasable or suitable to form part of a releasable connection, and the other is releasable between said two stiff portions.

36. Folded sheet means, comprising a sheet of paper or like material with a first set of concertina folds and a second set of folds transverse to the first set, the sheet being provided with two stiff portions, one of the stiff portions in the region of a corner of the sheet when it is unfolded and the other stiff portion on the opposite side of the sheet when it is folded with both sets of folds, characterized in that it comprises connection means adapted to serve for at least two connections, of which one is releasable or suitable to form part of a releasable connection, and the other is releasable between said two stiff portions.

37. The two stiff portions are separate from each other.

38. The folded sheet means comprises two separate connection means, adapted to serve for respective releasable connections between said stiff portions.

39. The two said connection means are at or towards opposite edges of the folded sheet means when folded.

40. Each of the two said connection means comprises a tongue, both tongues extending from one of said stiff portions inwardly thereof in opposite directions.

41. Each of the two said connection means comprises a tongue, both tongues extending from one of said stiff portions outwardly thereof in opposite directions.

42. Each of the two said connections means comprises a tongue, the two tongues extending from the stiff portions respectively and in the same direction, one extending inwardly of its stiff portion and the other extending outwardly of its stiff portion.

43. The folded sheet means comprises two separate connection means, one adapted to serve for releasable connection between said stiff portions and one adapted to serve for releasable connection of the folded sheet means to another object.

44. The folded sheet means comprises connection means having a common member adapted to serve for both releasable connection between said stiff members and releasable connection of the folded sheet means to another object.

45. Said common member comprises a ring.

46. Said common member comprises a tongue with a hole in it.

47. Said common member comprises a tongue with a loop fastening.

48. The loop fastening is partly cut from the tongue.

49. Said connection means comprises a tongue partly cut from one of said stiff portions.

50. Said connection means comprises a tongue extending from an interior edge of one of said stiff portions.

51. Said tongue has a free end extending inwardly of the last mentioned said one stiff portion.

52. The other of said stiff portions comprises guide means to receive and locate the last mentioned said tongue.

53. Said guide means comprises two projections as at edge of said other stiff portion to locate the last mentioned said tongue between them.

54. Said connection means comprise a tag extending from an interior edge of one of said stiff portions and adapted to serve for releasable connection of the folded sheet means to another object.

55. The tag is partly cut from its stiff portion.

56. Said connection means comprise a tag partly cut from a tongue extending from one of said stiff portions and adapted to serve for releasable connection of the folded sheet means to another object.

57. The tag is wider at a point nearer to a free end of the tag than at a point further from the free end.

58. The tag is T-shaped.

59. The tag is shaped and arranged so that it can be located to one side of the adjacent part of its stiff portion at said nearer point and simultaneously to the other side of the adjacent part of its stiff portion at said further point, thereby forming a loop.

60. At least the tag is of polypropylene.

61. At least one said stiff portion is of polypropylene.

62. The folded sheet means is adapted for use in the pocket.

63. The folded sheet means is connected to a key-ring.

64. The folded sheet means comprises an element that extends from the region of an edge of one said stiff portion and has a free end and an engaging portion that extends back towards said edge in the plane or slightly distorted plane of said element, said element being adapted to fold over said other stiff portion, said other stiff portion being provided with an edge under which said engaging portion can then engage to provide a releasable connection between the two stiff portions.

65. The engaging edge of said other stiff portion is provided by a slot.

66. Said engaging portion has one or more rounded extremities.

67. Said engaging portion is wholly internal of said element.

68. Folded sheet means, comprising a sheet of paper or like material with a first set of concertina folds and a second set of folds transverse to the first set, the sheet being provided with two stiff portions, one of the stiff portions in the region of a corner of the sheet when it is unfolded and the other stiff portion on the opposite side of the sheet when it is folded with both sets of folds, characterized in that it comprises an element that extends from the region of an edge of one said stiff portion and has a free end and an engaging portion that extends back towards said edge in the plane or slightly distorted plane of said element, said element being adapted to fold over said other stiff portion, said other stiff portion being provided with an edge under which said engaging portion can then engage to provide a releasable connection between the two stiff portions.

69. A modification in which one of said stiff portions is not part of said folded sheet means but another object than said folded sheet means comprises such stiff portion.

70. Folded sheet means comprising a sheet of paper or like material with a first set of concertina folds and a second set of folds transverse to the first set, the sheet being provided with a stiff portion arranged to lie on one side of the sheet when it is folded with both sets of folds, characterized in that it comprises connection means adapted to serve for at least two releasable connections between the folded sheet means and another object, whereby said object is arranged to lie on the opposite side of the folded sheet when it is folded.

71. Connection means, characterized in that it comprises a tag extending from an interior edge of a sheet of stiff material and adapted to serve for releasable connection of the stiff material to another object.

72. The tag is partly cut from the stiff material.

73. Connection means, characterized in that it comprises a tag partly cut from a tongue extending from the sheet of stiff material and adapted to serve for releasable connection of the stiff material to another object.

74. The tag is wider at a point nearer to a free end of the tag than at a point further from the free end.

75. The tag is T-shaped.

76. The tag is shaped and arranged so that it can be located to one side of the stiff material at said nearer point and simultaneously to the other side of the stiff material at said further point, thereby forming a loop.

77. At least the tag is of polypropylene.

With reference to Feature 1, as will be hereinafter exemplified, the container is substantially flat, and may be in the form of a stationery envelope, i.e. of flexible sheet material forming a back and front connected around their edges, or, again, may be a flat, substantially rigid container, perhaps with the back and front interconnected by a narrow wall around their edges. The sheet material may be paper or a plastics material used similarly to bear (usually printed) information, e.g. that produced by Du Pont and sold in the United Kingdom under the trade name Tyvec. By forming this material with a first set of concertina folds and transverse to these a second set of folds and making it so that when folded it fits (preferably closely) inside the container, it can be readily and securely retained therein with the aid of friction or the like. The term "to be retained therein with the aid of friction or the like" has reference to the container being open or readily openable to allow withdrawal of the folded up sheet material therefrom when required but the folded up sheet material being until then retained therein with the aid of one or more of the following:

(1) Friction;

(2) Electrostatic action (especially using the aforementioned plastics material for the sheet and using a plastics material for the container, e.g. being charged by frictional action upon inserting the sheet in the container when an envelope);

(3) Magnetic action (one of the sheet or container having magnetic means, e.g. as described in relation to FIG. 1 of the aforesaid previous patent specification, (which specification may be referred to for other details applicable to the present invention,) and the other being co-operatively magnetised or at least co-operatively magnetic, e.g. having inserts of soft iron or of a soft magnetic plastics material);

(4) At least one mechanical retaining portion of the container, which may be a lip or pimple (or opposing lip/s and/or pimple/s) at an open edge of the container (i.e. an edge having an opening for sliding the sheet material into and out of the container) to inhibit but not prevent withdrawal of the sheet from the container or, for similar purposes, may be a bend in the container, preferably at such open edge;

(5) Springiness of the sheet when folded up due to its mutually transverse sets of folds.

The multiple folding has the advantage of producing enhanced springiness for a certain area of information. If there is only one transverse fold, the springiness may be too tight but this is substantially eased by having a plurality of folds in the transverse (second) set of folds. The number of folds chosen for each set will depend upon the particular application.

To free (or at least partially free) the sheet material for withdrawal, the open edge just mentioned may be opened by pressing together two opposite edges of the container adjacent the open edge, or again the sheet material when being grasped where it projects from the open edge may be compressed to help free it.

The words "with the aid of" include the case of the friction or the like being directly or indirectly applicable to the folded sheet, where "indirectly" may have reference to the sheet being located in a carrier or like member, itself retained in the container by friction or the like, as exemplified below.

As envisaged, the action is seen preferably as the springiness aiding any of the other means of retention because this is considered the simplest to produce and the most reliable to use, although it is possible that the mutually transverse sets of folds will only provide the necessary bulk to aid the other means of retention, e.g. electrostatic attraction, (without the springiness). In particular, the choice of concertina folds (i.e. folds in alternately opposite directions) for one of the sets of folds provides a reliable and consistent shape to the folded up sheet material, usually compacts it into a smaller bulk than repeated folds in the same direction (or, alternatively, than repeated halving folds) and facilitates a second set of folds transverse to the first set, especially so that the resulting sheet material when folded up shall have a reliable and consistent shape to ensure continued reliable and consistent operation of the sheet material container means under conditions of repeated withdrawal and replacement of the folded up sheet material from and into the container. A further advantage of the concertina folds is to allow ready opening and closing of the sheet material, in the manner described in the present inventor's aforesaid previous patent specification. While an advantageous embodiment can be obtained in which the second set of folds consists of a single fold, substantial advantages accrue from the second set of folds consisting of a set of concertina folds: the springiness is enhanced and the size of the sheet material (and hence the quantity of information that it can bear) can be greatly increased with minimal increase in its thickness. By making the first set of folds comprise an odd number of folds and the second set of folds comprise an even number of folds, the process of opening the folded sheet is greatly facilitated, in the manner described in the aforesaid previous patent specification.

If the container has a cut-out shape at its open end, this can facilitate grasping and withdrawing from it the folded sheet (or, as described below, a selected sheet if there are two (or more) of them in the container, or if one of these is replaced by another card-like object). As further described below, if the container is to have the form of two sheets welded or otherwise fastened together peripherally, manufacture can be greatly facilitated. Again, if the container comprises two sheet-like portions hinged together (e.g. along one edge) and releasably fastened together (e.g. along an opposite edge) by said at least one mechanical retaining portion, a more robust aid in retaining the folded sheet material in said container can be provided, e.g. for use of said sheet material container means as a luggage label for attachment e.g. to a suitcase or briefcase. In particular, to aid ready access to the folded sheet material, said at least one mechanical retaining portion may comprise at least two press-stud means spaced apart along said opposite edge of the container.

To facilitate ready opening and closing of the folded sheet material, in the manner described in the aforesaid previous patent specification, the folded sheet material has a first set of concertina folds and transverse to these a second set of concertina folds and is provided with two stiff portions, one at each of the outer segments of said folded sheet material when folded, which segments are at diagonally opposite coners of the sheet when unfolded. However, in the present context, one of said stiff portions can be provided by the container, since its essential requirement is that it should be readily grasped by one hand. This also has the concomitant advantage that the folded sheet material will not become separated from the container. Generally, this will be a desired object of the invention, although there may be other purposes. For example, in a particular embodiment applicable to key-rings, a projecting portion from one corner of the unfolded sheet is attached to the container so that, for example, if a key on the key-ring is in the ignition switch of an automobile, the sheet material can be unfolded from its container attached to the key-ring to disclose a map or address without the key having to be removed from the ignition switch.

For use as e.g. a luggage label or in the pocket or a purse or handbag so as not to be easily mislaid, said sheet material container means is substantially of credit card size, i.e. 8.5 cm by 5.35 cm (or 3.4 in by 2.15 in) ±10%. For use in relation to a key-ring, said sheet material container means may be the same (credit card size) or substantially one-quarter to one-half of credit card size, preferably substantially one-third of credit card size, i.e. 2.8 cm by 5.35 cm (or 1.1 in by 2.15 in) ±20%. As found by experiment, in each case, these sizes represent a reasonable compromise between conveniently small size, an adequate provision of information-bearing surface and convenient size to facilitate use.

The sheet material container means may be sold in the form of a kit of parts, in which, for example, there is provided a single container, e.g. with attachment means suitable for attaching to a key-ring, bracelet, necklace or the like, and a plurality of said folded sheets (whether or not each sheet is actually folded up, although provided with said fold lines), for example being maps of different areas such that the user may select the relevant map to take with him or her on a particular journey. Another possibility is for the different sheets to contain phrases in respective languages. Another possibility is for the different sheets to contain respective addresses, each perhaps associated with a sketch map to find it and/or notes on public transport to reach it. Further examples might be different sheets having respectively different ranges of paint/wallpaper/carpet/curtain colours/patterns. For example, for different suites of furniture, there may be respective sheets, one (or more) of which a prospective customer may take away, e.g. to other shops to try and find matching materials for a room.

In order to facilitate manufacture and/or use of the sheet material container means, or otherwise improve the same, it may be provided with any of the Features 15 to 20.

As referred to above, apparatus for producing sheet material container means as aforesaid may usefully comprise Feature 25. This can greatly facilitate the manufacture of said sheet material container means. Apparatus for producing sheet material container means as aforesaid may usefully comprise any of the Features 26 and 27. The invention also extends to corresponding processes.

The aspect of the invention mentioned above with reference to Feature 31 can be particularly useful for attaching an information sheet to e.g. a corner of a drawing board so that it may readily be opened to disclose a large quantity of information, e.g. drafting symbols, and yet readily folded up again when these are not required to remain in view, and at all times remaining attached to the drawing board so as not to be lost. For example, the folding sheet means might suitably be attached to lie on the top right-hand corner of the board and open outwardly to the right, off the board. Alternatively, it might be attached on the top left-hand corner of the board and open to the right, onto the board. The sheet material might usefully be transparent to afford ready comparison of a drawn symbol and a drawing thereunder, e.g. for selection of a symbol of suitable size, the drawing for this purpose being moved around under the unfolded sheet. Again, the folded sheet may have pressure transfer letters and/or symbols or the like on its underside and be transparent so that these can be transferred by pressure onto the drawing. If the adhesive is one of the readily re-adhering kinds, the folded sheet means can be readily (but not so readily as to be insecurely attached) detached from its position and used and then replaced. Alternatively, the self-adhesive material may be provided to an intermediate member with suitable means (e.g. magnetic) to attach the folded sheet material to the intermediate member and detach it therefrom at will. Any of the methods herein described may also be used, only replacing the tail and ring or other attachment means for a key-ring, luggage or the like by adhesive material for attaching the folded sheet means to the aforesaid holding surface.

According to a further aspect of the invention, sheet material means comprising sheet material and means for attaching the same to a key-ring, luggage or other portable object, or for attaching it to a holding surface, are characterized in that the sheet material has a first set of concertina folds and transverse to these a second set of concertina folds and said sheet material means comprises means for normally (except when it is desired to open the same) keeping said sheet material means folded.

The various Features 35 to 70 provide folded sheet means that are particularly useful in various contexts, e.g. in the pocket and on a drawing board. The doubling of the connection function allows a much greater degree of reliability and confidence in use of the folded sheet means than might be expected. For example, while ensuring that it can remain closed and attached to a key-ring, chain or other connector or, if intended to be used free of such connector, providing reinforced fastening, this feature also enables for example ready accessibility, e.g. in the pocket, since one can then feel for the folded sheet means among miscellaneous other articles in the sure knowledge that either the folded sheet means is attached to a key-ring etc., and can thus readily be withdrawn from the pocket, or even if one accidentally opens one connection (to determine what the article is) the other connection will maintain the folded sheet means closed while it is withdrawn from the pocket.

The further features of any one of Features 37 to 61 make the folded sheet means much more useful, particularly easy and economical to manufacture, particularly easy to operate and more effective. The provision of two connection means for releasably connecting together said stiff portions allows a positive and satisfactory means for holding the folded sheet means closed, more particularly when the two connection means are arranged towards opposite ends of the folded sheet means. The tag form of connection means, while allowing for ready manufacture yet is also capable of simple and ready erection by the user. Some of the embodiments also lend themselves to making their opening and/or closure more interesting, which is considered to be an advantage for the folded sheet means when used as a promotional item. For this last use and purpose, the combinations of features in some of the embodiments have been found to be overwhelmingly attractive to the mind, which seems to sense a coordination of purpose and usefulness even though this might not be readily apparent. In the context of a drawing board, as with a key-ring etc., the folded sheet means are kept closed and yet anchored to make them particularly accessible.

Folded sheet means having the features of Feature 64 have the advantages that they are more difficult to open, and particularly by being able to have the features of Feature 65 less likely to be opened, by accident, e.g. when reaching into the pocket or by catching on something else in the pocket. Also, the fastening can be made flatter or thinner, more convenient and, particularly by being able to have the features of Feature 66, less dangerous, e.g. than having sharp edges which can cause painful damage by running up under a fingernail. When having the feature of Feature 65, less material is absent from said other stiff portion, which can therefore remain stronger. These various features can of course be applied without having the other releasable connections and, according to another aspect of the invention, there is provided a means as recited in Feature 68. By virtue of features disclosed herein, e.g. connection means adapted to serve for a connection which is suitable to form part of a releasable connection, the folded sheet means is suitable for connection to a key-ring and can be provided with the feature of Feature 63. By reason of some or all of these features, and others disclosed herein, the folded sheet means are particularly adapted for use in the pocket.

According to other aspects of the invention there are provided connection means as recited in Feature 71 or 73. There can also be provided the further features of Features 72 and 74 to 77. The inventor has appreciated that the tag may have advantages as indicated above even when it is used in a context that does not include folded sheet means. Other advantages are as mentioned above.

BREIF DESCRIPTION REFERRING TO THE DRAWINGS

Reference will now be made to the accompanying drawings, in which:

FIG. 1 is a plan view of a folded sheet of an embodiment of the invention;

FIG. 2 is a diagrammatic end view of the folded sheet of FIG. 1, slightly open;

FIG. 3 is a plan view of a container of an embodiment of the invention;

FIGS. 4 and 5 are perspective part views of two different forms of the container of FIG. 3;

FIG. 6 is a plan view of the container of FIG. 3 housing the folded sheet of FIG. 1;

FIG. 7 is a plan view of an embodiment of the invention suitable for use as a luggage label;

FIG. 8 is a view corresponding to FIG. 7 but showing the container opened;

FIG. 9 is a diagrammatic cross-section of the FIG. 7 embodiment taken along the line 9—9;

FIG. 10 is a part plan view, corresponding to FIG. 3, of another embodiment in which there is a pimple or lip;

FIG. 11 is a cross-section of FIG. 10 along the line 11—11;

FIG. 12 is a cross-section of FIG. 10 along the line 12—12;

FIG. 13 is a diagrammatic plan view of a further embodiment of the invention with the folded sheet unfolded;

FIG. 14 is a side view of apparatus in the form of an assembly line embodying the invention for producing one form of said sheet material container means;

FIG. 15 is a plan view of a modification of the FIG. 14 apparatus;

FIG. 27 is a perspective view of folded sheet means embodying the invention;

FIG. 28 is a cross-section along the line 2—2 of FIG. 27;

FIGS. 29 to 33 are views corresponding to FIG. 27 of alternative embodiments of the invention;

Figure 34:
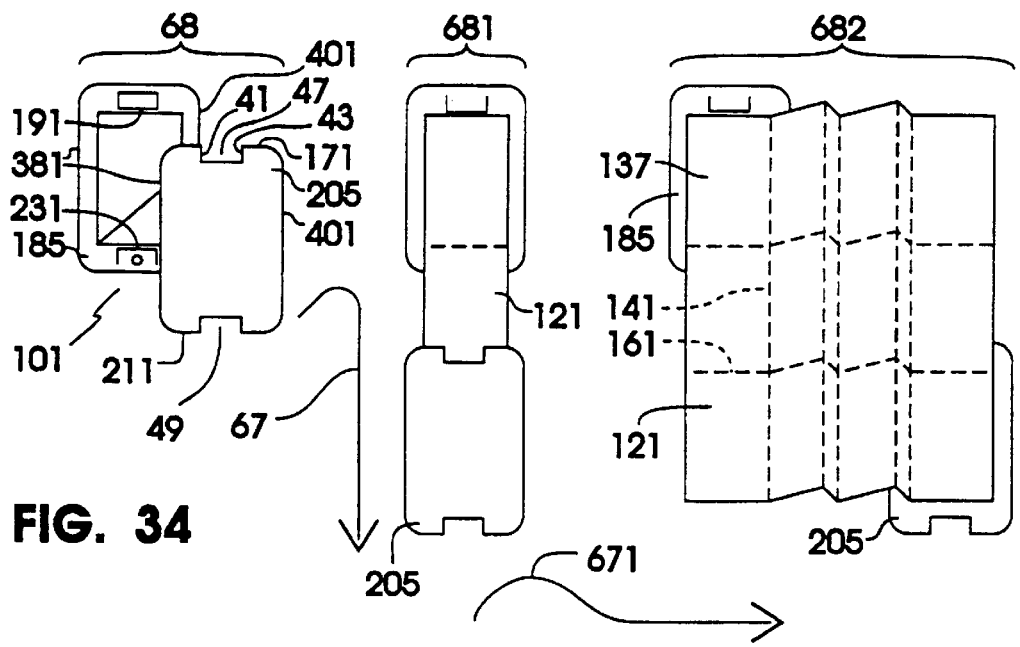
FIG. 34 is a schematic plan of stages of opening of the FIG. 32 embodiment.
Figure 35:
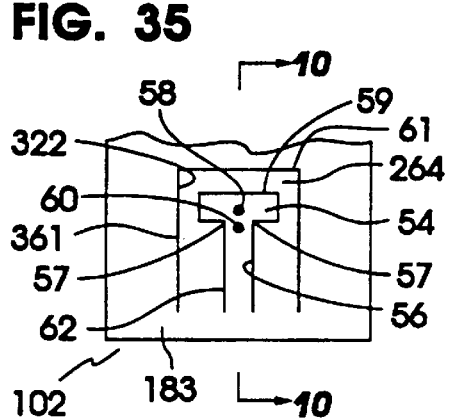
FIG. 35 is a plan view of an embodiment of the invention comprising a tag.
Figure 36:
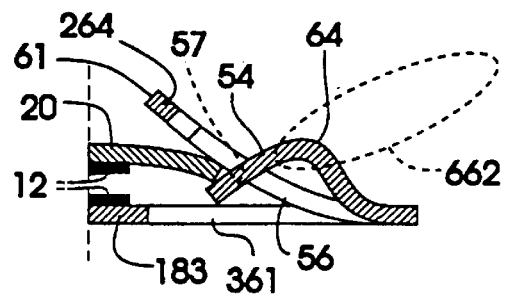
FIG. 36 is a cross-section along the line 10—10 of the FIG. 35 embodiment but after the tag has been erected.
Figure 37:
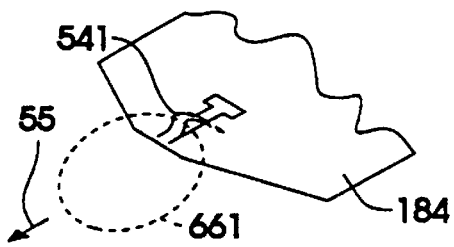
Figure 38:
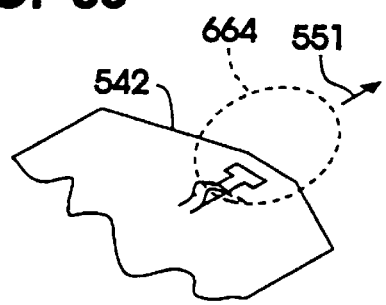
Figure 42:
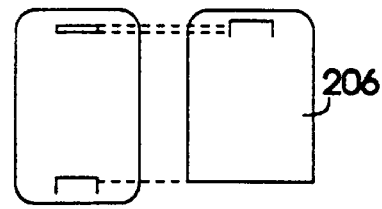
Figure 43:
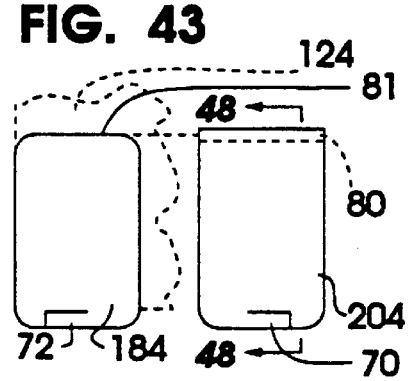
Figure 47:
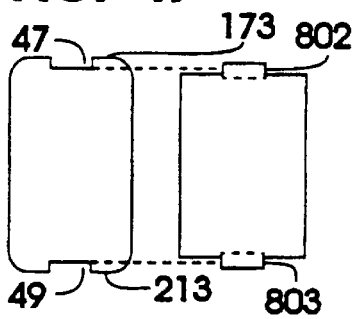
Figure 48:
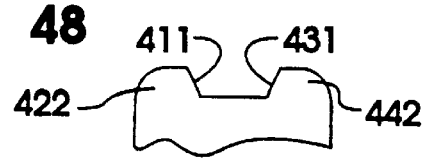
Figure 59:
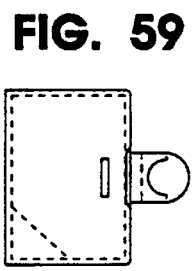
Figure 60:
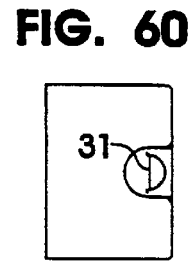
Figure 61:
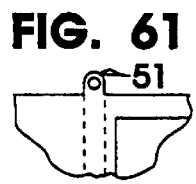
Figure 62:
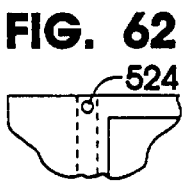
Figure 71:
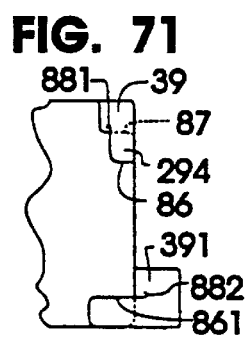
Figure 72:
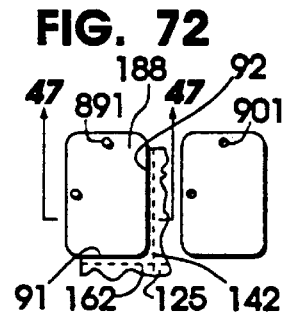
Figure 73:
Figure 74:

FIGS. 37 and 38 are perspective views of alternative embodiments of the invention comprising a tag operable in the manner indicated in FIG. 36; and FIGS. 39 to 77 are a series of schematic plan views in explanation and variation of the embodiments of the foregoing FIGS. 27–38, except that FIGS. 61–67 and 71 are partial views (FIGS. 61 to 64 showing alternative examples of a detail of the top centre of FIG. 58, FIGS. 65 to 67 showing alternative examples of a detail of the right centre of FIG. 60 and FIG. 71 showing an end or side of a folded closed embodiment with alternative connection means) and FIGS. 73 and 74 are schematic cross-sections along the lines 47—47 in FIG. 72 and 48—48 in FIG. 43 respectively.

Referring to the drawings, like numeral references in different Figures refer to like parts. References (other than those with a superscript 1 ($^1$) suffix) having the same first pair of digits denote items that have a similar function, and some of these may not be mentioned herein explicitly, or their function detailed, where this notation makes their function obvious.

DETAIL DESCRIPTION OF PREFERRED EMBODIMENT

Figure 25:
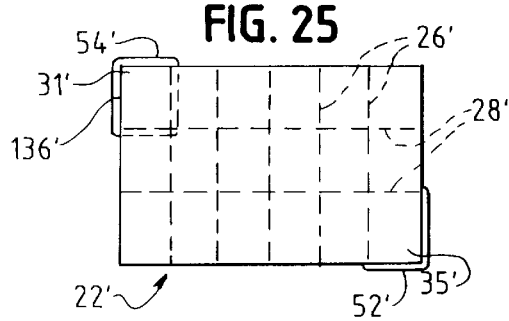
FIG. 25 is a plan view of the sheet material shown in FIG. 1 when open.
Figure 26:
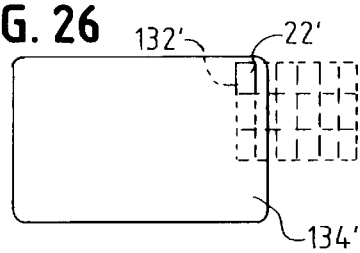
FIG. 26 is a plan view of a drawing board with the sheet material attached thereto.

Sheet material container means $20^1$, FIG. 6, comprise an envelope or like container $24^1$, FIG. 3, and sheet material $22^1$, FIG. 1, to be contained therein. The sheet material $22^1$ has a first set of concertina folds $26^1$ and transverse to these a second set of folds $28^1$ and fits inside the container $24^1$ to be retained therein with the aid of friction or the like as aforesaid, e.g. springiness of the sheet $22^1$ when folded up due to its mutually transverse sets of folds $26^1$, $28^1$ and/or at least one mechanical retaining portion $34^1$, $46^1$, $48^1$ of the container $24^1$. The container $24^1$, FIG. 3, is open at least at one end $32^1$. The second set of folds $28^1$ may consist of a single fold $28^1$ but, as aforesaid, preferably consists of a set of concertina folds $28^1$, more preferably the first set of folds $26^1$ comprising an odd number (five, as exemplified in FIGS. 13 and 25) and the second set of folds $28^1$ comprising an even number (two, as exemplified in FIGS. 13 and 25) of folds. The manner of opening and closing the sheet $22^1$ in the embodiment of FIGS. 1 and 25 is to grasp the back stiff portion $54^1$, FIG. 2, in one hand and the front stiff portion $52^1$ in the other hand, each portion by its side edges, preferably portion $54^1$ in the left hand and portion $52^1$ in the right hand, and separate these by pulling forwards and turning over portion $52^1$ to open the sheet $22^1$ to the position shown in FIG. 25. Closure is effected by a reverse movement. The manner and advantages of opening and closing the sheet $22^1$ in the embodiments of FIGS. 1 and 25 and FIG. 13 respectively are in accordance with the more detailed discussion in the aforesaid previous patent specification, although the manner of inserting the folded sheet $22^1$ into the container $24^1$ in the FIG. 13 embodiment will be described below.

To facilitate grasping and withdrawing the folded sheet $22^1$ from the container $24^1$, in the embodiments of FIGS. 4, 5, 6, 10 and 13, the container $24^1$ has a cut-out shape $30^1$ at its open end $32^1$. In the embodiment of FIGS. 10 and 11, as also that of FIG. 12 which has a similar plan view, the container $24^1$ has at least one inwardly directed lip $34^1$, pimple, stud or similar mechanical retaining portion to facilitate retaining the folded sheet $22^1$ therein.

The container $24^1$, FIG. 3, may have the form of a substantially rigid container with the shape shown in FIG. 4, having narrow side walls $66^1$ interconnecting front and back sheet-like portions $36^1$, $38^1$, or may be substantially flexible and have the form shown in FIG. 5, and be as shown in cross-section in FIG. 14, and in each case may be formed of two sheets $36^1$, $38^1$ welded or otherwise fastened together peripherally, as indicated diagrammatically by arrows $62^1$, $64^1$ along edges $68^1$, $70^1$. The sheet $22^1$ may be withdrawn by grasping it at portion $72^1$, FIG. 6, which is facilitated (to help the sheet $22^1$ pass the lip $34^1$, pimple, stud or similar mechanical retaining portion) by squeezing slightly towards each other edges $68^1$, $70^1$ and/or by squeezing together the upper and lower layers $52^1$, $54^1$ of sheet $22^1$ and/or by roughening portion $72^1$ to make it easier to grasp this with the thumb. This roughening is particularly useful if two sheets $22^1$, $22^1$ (as shown in FIG. 6) are inserted at the same time in a single container $24^1$, one on top of the other as seen in the plan view in FIG. 6, in which case the respective roughened portions $72^1$ of the two sheets $22^1$ face outwardly in opposite directions (one towards the viewer of FIG. 6 and one away from the viewer) so that either can be selected by pulling with the thumb on the respective roughened portion $72^1$. This action (in the case of two sheets) can be facilitated by two pimples $71^1$, $73^1$, one effective as aforesaid to inhibit (but not prevent) the withdrawal of each sheet $22^1$, e.g. as shown in FIGS. 4 and 6. If there is only one sheet $22^1$, each of pimples $71^1$, $73^1$ may be aided by an opposing pimple $75^1$, $77^1$. Such a pimple may be extended into lip $34^1$, FIGS. 10 and 11. The container $24^1$ may be of clear material so that information distinguishing each sheet $22^1$ can clearly be discerned through one face or the opposite face of container $24^1$ respectively. Retention of sheet $22^1$ in container $24^1$ may further be aided by roughening or figuring of the outer surface of the or each face of sheet $22^1$ that comes into contact with the inside of container $24^1$. It is to be borne in mind that sheet $22^1$ should be retained so firmly within container $24^1$ that it will not fall out with normal handling of the sheet material container means $20^1$, yet the design of the latter is to facilitate deliberate withdrawal of the sheet $22^1$ from the container $24^1$.

In the embodiment of FIGS. 7, 8 and 9, the container $24^1$ comprises two sheet-like portions $40^1$, $42^1$ hinged together at hinge $44^1$ and releasably fastened together by said at least one mechanical retaining portion $46^1$, $48^1$ to aid in retaining the folded sheet material $22^1$ in said container $24^1$. As shown, said at least one mechanical retaining portion comprises two press-stud means $46^1$, $48^1$ spaced apart along an edge $50^1$ of the container $24^1$, which edge $50^1$ is opposite the hinge $44^1$. The press-studs $46^1$ engage in holes $48^1$ to keep the container $24^1$ closed and to help retain sheet $22^1$ firmly therein. Container $24^1$ itself provides the back stiff portion $54^1$ mentioned above which co-operates with front stiff portion $52^1$ to facilitate rapid and ready opening and closing of sheet $22^1$ in the manner described in the aforesaid previous patent specification. When front portion $42^1$ is closed (into the position shown in FIG. 7) a window in the form of slot $72^1$ discloses information thereunder on the front of stiff portion $52^1$, e.g. disclosing a name $74^1$ but hiding an address $76^1$ from the casual observer of the closed sheet material container means $20^1$ so that the latter can serve usefully as a luggage label that avoids showing the address to a potential burglar on the lookout for such information concerning departing travellers at an airport, for example.

FIGS. 10, 11 and 12 illustrate embodiments with a retaining lip $34^1$, as described above. The container $24^1$ may be welded along edges $68^1$, $70^1$ as described above or may be a snap-fit as shown in FIG. 12.

In the embodiment of FIG. 13, the sheet $22^1$ has a portion $78^1$ extending from one corner. When sheet $22^1$ is folded, stiff portion $54^1$ can be used to ease portion $78^1$ and the rest of sheet $22^1$ into container $24^1$, itself serving as the other aforementioned stiff portion $52^1$ of sheet $22^1$. In this action, the upper part $79^1$ of portion $78^1$ is fixed to the inside of container $24^1$ and the folded up sheet $22^1$ is pushed up into container $24^1$ until the fold $81^1$ reaches the top (as seen in FIG. 13) edge $25^1$ of container $24^1$, portion $78^1$ then being folded about line $27^1$, so that part $29^1$ of one of the folds $28^1$ (which will then be substantially at the bottom of the folded up sheet $22^1$) then overlies line $27^1$, with segment $31^1$ overlying the folded up portion $78^1$.

FIG. 14 illustrates apparatus $60^1$ embodying the invention for use in a process embodying the invention, in which at a first station $84^1$ a first sheet-like portion $38^1$ of container $24^1$ is placed on conveyer $80^1$ moving in the direction of arrow $82^1$, this moves to a station $86^1$ at which folded sheet $22^1$ is placed upon portion $38^1$ and then to a further station $88^1$ at which a second sheet-like portion $36^1$ of container $24^1$ is placed over sheet $22^1$ to sandwich the latter therebetween, and the sandwich then proceeds to a further station $90^1$ at which there is welding or other fastening at positions indicated diagrammatically by arrows $62^1$, $64^1$ along edges $68^1$, $70^1$, FIG. 5, and along a remote (as seen in FIG. 14) transverse edge of container $24^1$. In an alternative arrangement, portions $36^1$, $38^1$ may be a single unfolded sheet which is simply folded over at the third station $88^1$ and then only requires welding (or other fastening) along edges $68^1$, $70^1$.

The various parts of the sheet material means $20^1$ may be supplied to the belt $80^1$ by hand or, preferably, by any convenient means, e.g. hoppers or cross-belts.

The sheet material container means $20^1$ may have a size within the ranges, and as and for the purposes, hereinabove mentioned.

A particularly useful arrangement is of the kind indicated in relation to FIG. 6, with two sheets of material $22^1$, but in which the second sheet $22^1$ is replaced by a hotel room key of the kind comprising a card having punched out (or otherwise coded) portions and intended to be disposed of after a stay at the hotel.

The aforementioned bend in the container at its open end $32^1$ may suitably be a bend of the (substantially planar) container out of its plane (e.g. towards the viewer as seen in FIG. 10) in the region of its end $32^1$ so as further to ensure that the contained sheet material cannot simply fall out. The bend can be straightened to facilitate withdrawal of the sheet material $22^1$ by pressing together the opposite edges $68^1$, $70^1$ (unless the container $24^1$ is rigid, in which case the upper and lower stiffened layers $52^1$, $54^1$ of the sheet $22^1$ are pressed together).

Turning now to the carrier arrangement mentioned above, and referring to FIGS. 14 and 15, at station $86^1$ there is arranged a transverse belt $92^1$ (on rollers having axes $91^1$, $93^1$) on which, at a first station $94^1$, a carrier $96^1$ (to be described below) is placed on belt $92^1$ and at a second station $98^1$ a folded sheet material $22^1$ is placed in carrier $96^1$. At a third station $100^1$ the combined sheet material $22^1$ and carrier $96^1$ are transferred onto belt $80^1$ at station $86^1$. This may be done simply by movement of belt $92^1$ in the direction of arrow $102^1$ or may be done by specific means $104^1$ in the form of a chute, hydraulic ram or other suitable arrangement. Thereafter, the combination of sheet material $22^1$ and carrier $96^1$ progresses to stations $88^1$ and $90^1$ as described above. The combination may be formed at station $98^1$ simply by placing sheet material $22^1$ with its stiff portions $52^1$, $54^1$, see FIG. 2, into carrier $96^1$. Alternatively, at station $98^1$, sheet material $22^1$ without stiff portion $54^1$ may be attached to carrier $96^1$, which thereby serves as the stiff portion $54^1$ and there is then no carrier $96^1$ in the sense of this being a separate member from sheet material $22^1$.

Carrier $96^1$ is provided with a tail $106^1$ and a ring $108^1$ on the end of the tail, for a purpose to be described below. The tail and ring $106^1$, $108^1$ may be formed as one, e.g. as one piece with each other and/or carrier $96^1$, e.g. as a moulding, in which case it is convenient (but not essential) for the tail $106^1$ and ring $108^1$ to be of the same material as the carrier $96^1$, e.g. plastics material. Alternatively, tail $106^1$ and ring $108^1$ may be formed separately and attached together and to carrier $96^1$ subsequently, in which case tail $106^1$ may be a chain and both this and ring $108^1$ may be of metal. Certain preferred arrangements are as follows: tail $106^1$ and ring $108^1$ are of nylon; ring $108^1$ is of metal and tail $106^1$ is of plastics material; ring $108^1$ is of metal-reinforced plastics material (e.g. a metal ring embedded in a plastics ring forming one with tail $106^1$); ring $108^1$ is of metal and tail $106^1$ is a metal chain having an anchor embedded in plastics carrier $96^1$.

Any suitable manner of fixing tail $106^1$ to carrier $96^1$ may be used, several of which are known in the art of making key-ring attachments.

Two variants may be convenient compared with FIG. 15. The tail $106^1$ may be affixed to the long edge instead of the short edge (e.g. then projecting over the side of belt $92^1$) and/or the carriers $96^1$ and sheets $22^1$ shown portrait orientation in FIG. 15 may, instead, be in landscape orientation as seen in FIG. 15. Such changes in orientation may be applied readily to any of the embodiments disclosed herein.

Figure 16:
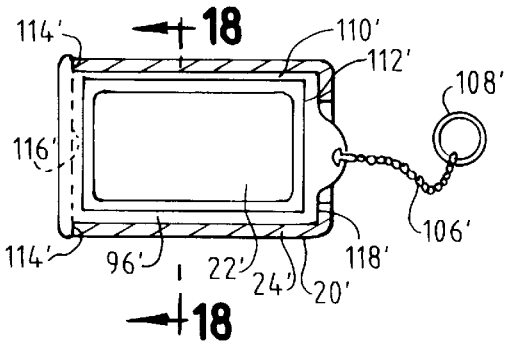
FIG. 16 is a horizontal cross-section taken just above the carrier and just below the upper wall of the container of an embodiment alternative to that shown in FIG. 6.
Figure 17:
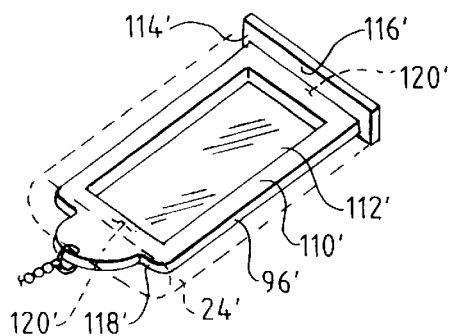
FIG. 17 is a perspective view of the FIG. 16 embodiment showing the container in dotted lines but omitting the folded sheet.
Figure 24:
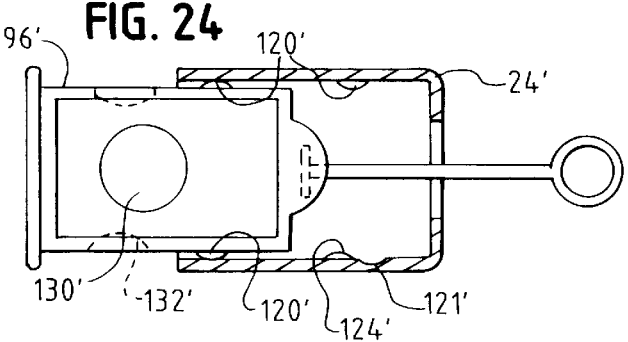
FIG. 24 is a plan view of the FIG. 16 embodiment illustrating alternative means to facilitate removal of the folded sheet from the carrier.

In further embodiments shown by way of example, sheet material container means $20^1$, FIGS. 16 and 17, comprises a carrier $96^1$ having a tray-like form with a thick outer rim $110^1$ defining an inner recess $112^1$ in which is located folded sheet material $22^1$. Carrier $96^1$ has shoulders $114^1$ projecting sideways at the end remote from tail $106^1$, an edge shoulder $116^1$ projecting upwardly from that end and shoulders $118^1$ at the end adjacent tail $106^1$. Any or all of these shoulders cooperate with container $24^1$, (which is generally tubular in cross-section, apart possibly from one or both of its ends,) to prevent carrier $96^1$ from being pulled right through container $24^1$ by means of tail $106^1$. Carrier $96^1$ is retained in container $24^1$ by friction or the like, as aforesaid, e.g. friction due to the springiness of sheet material $22^1$ (located in recess $112^1$) between the carrier $96^1$ and sheet material $22^1$ respectively and the lower and upper inner surfaces of container $24^1$ and/or friction between surfaces of the carrier $96^1$ and internal surfaces of container $24^1$. Retention may, as exemplified in FIG. 24, be aided by means of cooperating catches or lugs $120^1$, $120^1$, cooperating lugs $120^1$ and recesses $121^1$, and/or cooperating cams $120^1$ and cam surfaces $124^1$. These may be located along one or both outside side surfaces of carrier $96^1$ and the inside adjacent side surfaces of container $24^1$, or may be located on one only of said carrier $96^1$ and container $24^1$ and cooperate with the other by means of friction upon an uninterrupted surface thereof. A cooperating pair may be located anywhere convenient, e.g. a pair of lugs $120^1$, $120^1$ (or a lug $120^1$ and recess $121^1$) may form a catch adjacent shoulder $116^1$ or shoulder $118^1$, as indicated in FIG. 17.

Figure 18:
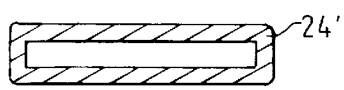
FIG. 18 is a central vertical cross-sectional view of container 24, taken along the line 18—18 in FIG. 16.

Container $24^1$ has a cross-sectional shape as seen in FIG. 18. The whole sheet material container means $20^1$ may then be formed as seen in FIGS. 14 and 15 combined.

Figure 19:
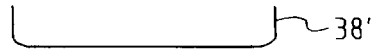
FIGS. 19 to 22 are diagrammatic views corresponding to FIG. 18 of different stages in manufacture of the FIG. 16 embodiment using a machine as illustrated in FIGS. 14 and 15.
Figure 20:
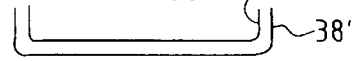

Alternatively, container means $20^1$ may be formed as illustrated in FIGS. 19 to 22, by having a further station $122^1$, between stations $84^1$ and $86^1$, at which carrier $96^1$ is placed into portion $38^1$ of container $24^1$ from a hopper or from a belt like $92^1$. Then at station $86^1$, folded sheet material $22^1$ is placed into the container $96^1$ itself inside portion $38^1$, e.g. by belt $92^1$. It will be apparent that, at any of the stations $84^1$, ($122^1$ if included,) $86^1$, $88^1$, the part or parts being added onto belt $80^1$ may be supplied by hopper means or by transverse belt means such as $92^1$ or by any other suitable means; and any combination of these may be employed. FIG. 19 then illustrates the partially assembled container means $20^1$ at station $84^1$, FIG. 20 at station $122^1$ (if included), FIG. 21 at station $86^1$, and FIG. 22 at station $88^1$. This is followed by fastening together of the upper and lower portions $36^1$, $38^1$ at station $90^1$.

In another alternative, the placing of folded sheet material $22^1$ into carrier $96^1$ allows that carrier $96^1$ may be inserted directly into a ready assembled or pre-formed finished tube-like container $24^1$, without the need to assemble container $24^1$ after locating therein folded sheet material $22^1$. By using plastics material/s, suitable shoulder-like lugs may be made sufficiently springy and/or cooperating cam surfaces may be made sufficiently springy for the combination carrier and folded sheet material $96^1$, $22^1$ to be inserted in the direction indicated by arrow $102^1$ into a ready-made tube-like container $24^1$, so that it will not be readily withdrawable in the opposite direction to arrow $102^1$ by pulling on ring $108^1$ (but it will be readily withdrawable— to a limited extent—in the direction of arrow $102^1$, e.g. by grasping carrier $96^1$ by finger and thumb where it shows through recess $30^1$, at which place there may be, instead or additionally, grasping shoulders $114^1$ and/or $116^1$). Alternatively, particularly if tail $106^1$ and ring $108^1$ are somewhat stiff, e.g. when formed monolithically with carrier $96^1$, the carrier $96^1$ may be inserted from the opposite end of container $24^1$, i.e. in a direction opposite to arrow $102^1$.

In any of the embodiments described with reference to both of FIGS. 14 and 15, but particularly that in which the stiffness of tail $106^1$ and ring $108^1$ facilitate their being pushed first into a tubular container $24^1$ on belt $80^1$, there can be provided a stop $134^1$ which reciprocates vertically in the directions of arrow $136^1$ so that each approaching container $24^1$, or container part $38^1$, is halted temporarily (by slippage on belt $80^1$) while means $104^1$ correctly position carrier $96^1$ onto part $38^1$ or into container $24^1$. If appropriate, the same feature of a reciprocating stop like $134^1$ can be used at other stations temporarily to halt the advancing article on belt $80^1$ while the next member coming in is correctly located in relation thereto.

Figure 23:
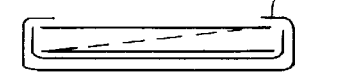
FIG. 23 is a view as FIGS. 19 to 22 of an alternative embodiment in which the central part of the top wall of the container is omitted.

As described above, in use of the sheet material container means $20^1$, carrier $96^1$ is withdrawn to the left, as seen in FIG. 16, from container $24^1$ until folded sheet material $22^1$ is clear of container $24^1$ and can be opened. When ring $108^1$ is located on a key-ring, the key-ring prevents carrier $96^1$ coming free from container $24^1$. Alternatively, there may be lug and limited slot means cooperating between carrier $961$ and container $24^1$ so as to prevent complete withdrawal of carrier $96^1$ from container $24^1$. In the latter case, for example, container $24^1$ need not be complete over carrier $96^1$ but need only enclose it a little way above the side edges of the recess $112^1$ in order to maintain captive therein the folded sheet material $22^1$, as illustrated in FIG. 23. In such case, the combination of carrier $96^1$ and folded sheet material $22^1$ may simply be snapped into position into container $24^1$, i.e. from the top as seen in FIG. 23, if container $24^1$ is made of suitable springy material.

To facilitate separating of folded sheet material $22^1$ from carrier $96^1$, if required, carrier $96^1$ may be provided with a hole $130^1$ through which a finger can push folded sheet material $22^1$ up and away from carrier $96^1$, or may be provided with side recesses $132^1$, like cut-outs, extending part or all of the whole height, (thickness) of carrier $96^1$, so that folded sheet material $22^1$ can be grasped at its edges between finger and thumb and lifted out of carrier $96^1$. A further possibility is for the base of recess $112^1$ to be wholly omitted (in effect, hole $130^1$ being as extensive as recess $112^1$) so that folded sheet material $22^1$ simply falls out of carrier $96^1$ when this is withdrawn to its full extent from container $24^1$.

Only brief mention has been made above of lugs, cams etc. since many different arrangements of these for similar purposes are already known.

Figure 21:
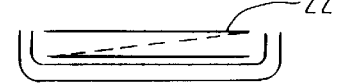
Figure 22:
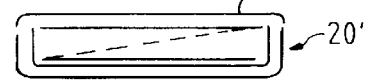

While FIGS. 21 to 23 show a particular direction of folding of the sheet material $22^1$, this could be varied by a rotation of folded sheet material $22^1$ through one or more right angles in the plane of FIG. 16.

While the method of preventing the carrier $96^1$ from being withdrawn too far (to the left as seen in FIG. 16) from container $24^1$ is due to the key-ring which links ring $108^1$, the latter may itself be made too large to pass (to the left as seen in FIG. 16) through a slot at the right hand end (as seen in FIG. 16) of container $24^1$. Ring $108^1$ may be passed through this slot initially by spring and cam action or the container $24^1$ may be formed around carrier $96^1$, in the manner described above with reference to FIGS. 19 to 22.

It is pointed out that the tail $106^1$ can be fixed to the sheet material $22^1$ (directly or via the member $96^1$ when this forms one stiff portion $54^1$ of sheet material $22^1$), to the (separate) carrier $96^1$, or to the container $24^1$.

When the sheet material shown in FIG. 22 is opened out, it has the appearance shown in FIG. 25. Its top left-hand (as seen in FIG. 25) segment $31^1$ can be provided with a layer of self-adhesive material $132^1$, as seen also in FIG. 2, and it may be attached as, and for the purposes, mentioned above, thereby to a holding surface $134^1$, which may be the top surface of a drawing board $134^1$. Thus, this embodiment provides folded sheet means $20^1$ comprising sheet material $22^1$ having a first set of concertina folds $26^1$ and, so as to be transverse to these when the sheet material $22^1$ is folded with these folds $26^1$, a second set of concertina folds $28^1$, the sheet material $22^1$ having two diagonally opposite segments $31^1$, $35^1$ which are at or near diagonally opposite coners of the sheet material $22^1$ and are defined by folds and/or edges thereof, one of the segments $35^1$ being adapted (by provision of stiff portion $52^1$) for grasping and opening the sheet material $22^1$ and the opposite segment $31^1$ being provided with self-adhesive material $132^1$ for attaching it to a holding surface $134^1$. Preferably, the stiff portion $52^1$ extends over substantially the whole area of said segment $35^1$. Preferably, said self-adhesive material $132^1$ extends over substantially the whole area of said segment $31^1$. Particularly in relation to this embodiment, said first set of folds $26^1$ should comprise an odd number of folds and said second set of folds $28^1$ should comprise an even number of folds.

Especially for use in the last-described embodiment, as also in the case of an attachment for a key-ring, luggage or other portable object in which no container is used, there should preferably be provided means $136^1$ for normally keeping said sheet material $22^1$ folded, e.g. magnetic means as described in the aforesaid previous patent specification, or lug means $136^1$ on stiff portion $54^1$ cooperating with stiff portion $52^1$, for which purpose the lug means and/or one or both of the stiff portions are suitably springy.

Various features of the different embodiments may be combined or omitted. For example, the window $72^1$ and layout of information 74¹, 76¹ of FIGS. 7 and 8 may be applied to the embodiment of FIG. 6. Various modifications and developments will be apparent to one skilled in the art, as also combinations with other ideas currently known or that become known in the future and the invention is intended to extend to all new and unobvious features and combinations of features thereby constituted or otherwise herein disclosed or implied. For example, another aspect of the invention provides an article suitable to fit to a key-ring, luggage or other portable object, characterized in that it comprises a container, a drawer to fit in the container, and an article fitted within the drawer so as to fall out of the same upon withdrawal of the drawer. Instead of being fitted so loosely in the drawer as to fall out therefrom upon such withdrawal, the fitting may be sufficiently tight (or so sprung in place) for the article fitted within the drawer to require to be pressed out from the drawer.

Folded sheet means 10, operable in the same manner as the folded sheet article indicated in the aforesaid previous patent specification is shown in FIGS. 27 and 28 (and, in principle, FIG. 34). This comprises a sheet of paper or like material 12 with a first set of concertina folds 14, 14 and a second set of concertina folds 16, 16 transverse to the first set, the sheet being provided with two stiff portions 18, 20 attached to the sheet 12 and arranged to lie on opposite sides of the sheet when it is folded with both sets of folds 14, 16. The stiff portions 18, 20 have the shape and size of a credit card and will usually (but not necessarily) be thinner. The folded sheet means 10 further comprises connection means 22, 24, 52 adapted to serve for at least two releasable connections, at least one (22 and 24) of which connections is between said two stiff portions 18, 20. The two stiff portions 18, 20 are separate from each other in this embodiment, although in the embodiment shown in FIG. 34 they are monolithic. In the present embodiment, e.g. as seen in FIGS. 27 and 28, the folded sheet means 10 comprise two separate connection means 22, 24, adapted to serve for respective releasable connections between said stiff portions 18, 20. The two connection means 22, 24 are at or towards opposite edges of the folded sheet means 10 when folded, as seen in FIG. 27. Each of the two said connection means 22, 24 comprises a tongue 26, 28, both tongues 26, 28 extending from one of said stiff portions 18 inwardly thereof in opposite directions, i.e. towards the middle of stiff portion 18, or at least away from the outside (periphery) thereof, to engage over edges 17, 21. Many other tongue arrangements have been tried by the present inventor, as hereinafter exemplified, but this arrangement gives great advantages in handling by the user.

As seen in FIG. 29, each of the said connection means comprises a tongue 261, 281, both tongues extending from one of said stiff portions 181 outwardly thereof in opposite directions, i.e. away from the middle of stiff portion 181, and engaging through slots 45, 46 respectively in stiff portion 201.

As seen in FIG. 30, each of the two said connection means comprises a tongue, the two tongues 262, 282 extending from the stiff portions 182, 202 respectively and in the same direction, one tongue 262 extending inwardly of its stiff portion 182 and engaging through slot 452 in stiff portion 202 and the other tongue 282 extending outwardly of its stiff portion 202 and engaging through slot 462 in stiff portion 182.

As seen for example in FIG. 27, the folded sheet means 10 comprises two separate connection means 22, 52, one 22 adapted to serve for releasable connection between said stiff portions 18, 20 and one 52 adapted to serve as part of a releasable connection of the folded sheet means 10 to another object, e.g. a key-ring (not shown) by virtue of the latter (or an intermediate link) being a split ring and therefore releasably threadable through the hole.

As seen for example in FIG. 33, folded sheet means 10 comprise connection means 522, 523, 662 having a common member 662 adapted to serve for both releasable connection between said stiff members and releasable connection of the folded sheet means 10 to another object, e.g. a key-ring (not shown). Said common member may comprise a ring 662, which interconnects stiff portions 186, 206 and also serves for a releasable connection to, for example, a key-ring (not shown). Alternatively, said common member may comprise, as shown for example in FIG. 32, a tongue 263 with a hole 521 in it or, as shown for example in FIGS. 35 and 36, a tongue 264 with a loop fastening 64. The loop fastening 64 is formed from a tag 54 partly cut away at line 62 from the tongue 264.

Figure 39:
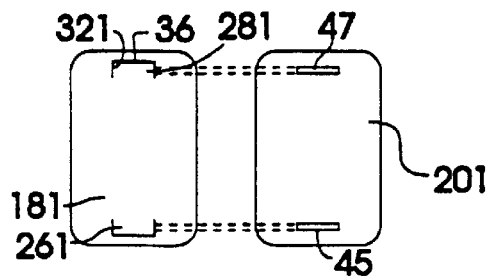

As exemplified in the FIG. 29 embodiment and its stiff portions 181, 281 shown in plan view at 82, FIG. 39, one of the connection means 241 comprises a tongue 281 partly cut along line 36 from one of said stiff portions 181. This tongue 281 extends from an interior edge 321 of said stiff portion 181, i.e. an edge which does not connect with the exterior (peripheral) edge of the stiff portion 181.

As seen for example in FIG. 35, the tongue 264 has a free end 61 extending inwardly of said stiff portion 183. This may be compared to tongue 26 or 28 seen in FIG. 27. The other stiff portion 20, FIG. 27, may comprise guide means 42, 44 to receive and locate the tongue 26. This is shown as an option in FIG. 27 by using chain lines. Similar guide means may be used for tongue 26. The resulting embodiment is shown in FIG. 32 and is found particularly conducive to ready use. It has what has been called "the right feel".

The manner of operation will be described with reference to FIGS. 28, 32 and 34. While FIG. 28 is a cross-section of FIG. 27, it also shows clearly some of the features of FIG. 32. The folded sheet means 101 of FIGS. 32 and 34 is sold (and received by the end user) in the folded condition seen in FIG. 32. To unfold it, stiff portion 185 is grasped (for a right handed person) in the left hand, while portion 205 is grasped in the right hand and is moved in the direction indicated schematically by arrow 67, that is outwards and down through the position shown at 68 to the position shown at 681. Continuing this movement in the manner indicated schematically by arrow 671, stiff portion 205 is turned over and pulled to the right as seen in FIG. 34 to open out the folded sheet means 101 to the position shown at 682, and finally pulled almost as far as possible away from stiff portion 185 to open folded sheet 121 almost flat. To refold the folded sheet means 101, reverse movements are used. Thus, sheet 121 can be completely unfolded with a single movement and completely refolded with a single movement. To lock the stiff portions 185, 205 together, various methods may be used. In one method, portion 205 is pulled slightly down as seen in FIG. 34 (as stiff portion 20 to the left as seen in FIG. 28) to unroll folded sheet 12 slightly at fold 162, FIG. 28. Edge 17, 171 can then be slid easily under edge 19, 191 and, by continuing the movement (of stiff portion 20 to the right as seen in FIG. 28) the stiff portion 20, 205 bows somewhat so that edge 21, 211 can readily be slid under edge 23, 231. Another method involves bending down ends 48, 50, FIG. 28, to raise and move apart edges 19, 23. It will also be readily apparent how bowing, bending or slight distortion of the two stiff portions and/or the tongues (including tongues 70, 72, FIG. 31) can achieve the same result. When first cut out, tongues 26, 28 are flat within stiff portion 18 but, once they are bent out of the plane of stiff portion 18, they retain most of such bend. When stiff portion 20 is released, its overall bowed shape transforms to a flatter shape bent at the ends, somewhat as seen in FIG. 28.

In the case of the FIG. 33 embodiment, the ring 662 is located permanently through hole 523 in stiff portion 186 and can be made to engage stiff portion 206 through its hole 522 by forcing its entry through slit 53, which may have a chamfered opening (shown in greater detail in FIG. 56) to the external edge of stiff portion 206 to facilitate this. The fact that slit 53 is located to the side of hole 522 helps to ensure that portion 206 will not accidentally come free from ring 662 by passing through slit 53. A suitable twisting movement of ring 662 can be used to distort stiff portion 206 in the region of slit 53 in order to open slit 53 when it is intended to release stiff portion 206 from ring 662 to open the folded sheet means.

As seen in FIG. 31, the connection means 22 may be replaced by connection means 221 comprising a pair of oppositely directed tongues 70, 72 that project towards or through notches 74, 76 in the respective stiff portions 184, 204 and inter-engage. The opposite connection means 24 may be replaced by a U-shaped end part 80 of stiff portion 204 which engages over the corresponding end of stiff portion 184 to hold the same captive in conjunction with tongues 70, 72. End part 80 may, alternatively to the U-shape, be folded over sharply.

For connecting the folded sheet means 10 to a key-ring, chain or other connector, there can be provided a connection means simply in the form of a hole 52. However, as indicated above, an alternative arrangement which can for example be used to avoid the need for a split ring (e.g. 66, FIG. 32), comprises, as seen in FIGS. 35 and 36, a tag 54 extending from an interior edge 56 of one of said stiff portions 183 (or it could almost as well be stiff portion 18, FIG. 27), and is adapted to serve for releasable connection of the folded sheet means 102 to another object (not shown). The tag 54 is partly cut from its stiff portion 183 by cutting it along the line 62, preferably at the same time that tongue 264 is partly cut along line 361 and in the same operation, with the advantages indicated above. Indeed, while tag 54 (as 541, FIG. 37) can be cut direct from the stiff portion 183, 184, it is, in the embodiment seen in FIG. 34, partly cut from tongue 264 itself extending from stiff portion 183. It will be seen from FIG. 35 that tag 54 is wider at a point 58 nearer to a free end 59 of the tag 54 than at a point 60 further from the free end 59. Tag 54, FIG. 35, is T-shaped. Other shapes are possible, e.g. that shown in FIG. 57, preferably having right angles at points 57 where the tag 54, 543 engages under opposite portions of edge 56, see FIGS. 35 and 36.

Tag 54 is erected by the user of the folded sheet means 102, FIGS. 35 and 36, or the stiff portion 184, FIG. 37 (described below) etc. As will be seen from FIGS. 35, 36 and 37, and with reference to the adjacent parts of the stiff portion 183, which in FIGS. 35 and 36 will be tongue 264. The tag 54, 541 is shaped and arranged so that it can be located to one side (below as seen in FIG. 36) of the adjacent part (tongue 264) of its stiff portion 183 at said nearer point 58 and simultaneously to the other side (above, as seen in FIG. 36) of the adjacent part (tongue 264) of its stiff portion 183 at said further point 60, thereby forming a loop 64. In order to erect tag 54 into loop 64, the user presses the point 58 in a direction, as seen in FIG. 35, going into the page and presses point 60 out of the page so that the cross-bar of the T-shape at point 58 slides behind (below as seen in FIG. 36) tongue 264 and is held captive by the opposed parts of edge 56 from the point 60 towards the root of the T-shape at edge 56, in the manner indicated in FIG. 36 and seen in perspective in FIGS. 37 and 38. This provides the loop 64 of tag 54, as discussed above, to which can be fastened a key, key-ring, chain or other connector 662, 663, 664. It is found in practice that, if the tag 54, and preferably the whole of stiff portion 18, are made of polypropylene sheet material, preferably 1 mm thick, the tag 54 (being perhaps ½ cm (¼ in) wide at point 58 and 1 cm (½ in) long from root to free end 59) provides a strong, serviceable and long-lasting loop 64.

Other possible materials for the stiff portions, tongues and/or tag might include nylon. They should preferably be hard-wearing, stiff but somewhat flexible, not easily tearable, and preferably with a "memory", i.e. having a degree of elasticity or tendency to return to shape, so that the folded sheet means can be produced and sold with the tongue already standing up at a small angle, of perhaps about 15° to 30°. This set may be aided by heat and/or pressure.

As seen in FIG. 37, the arrangement of tag 541 can be used even without the folded sheet means 10. Whether used in this manner or as part of the folded sheet means 10, it will immediately be apparent that, by putting a chain link or key-ring or other similar member 662, 663 through loop 64, thus not allowing loop 64 to collapse, the portion (cross-bar) of the T-shape at point 58 cannot escape and it is therefore possible alternatively to arrange the tag the opposite way round so that pull is in the opposite direction 551, FIG. 38, from the direction of pull 55 shown in FIG. 37.

For convenience, the plan views of FIGS. 39 to 47, 50 to 52, 54 and 72 are exploded to show the two stiff portions side by side but omit the folded sheet. It is to be understood that these views are diagrammatic and in fact, when the folded sheet means is folded with both sets of folds closed, the upper stiff portion (shown on the right of each view and corresponding to the upper stiff portion in FIGS. 27 to 33) overlies the lower stiff portion (shown on the left of each view and corresponding to the lower stiff portion in FIGS. 27 to 33), with the folded sheet therebetween affixed to both stiff portions.

Figure 40:
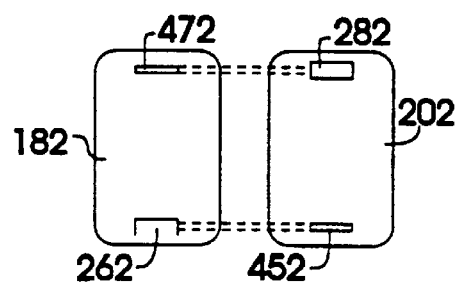
Figure 41:
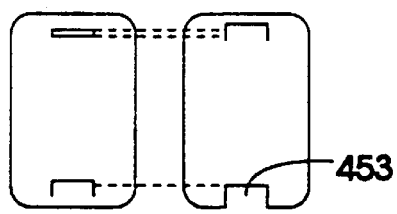
Figure 44:
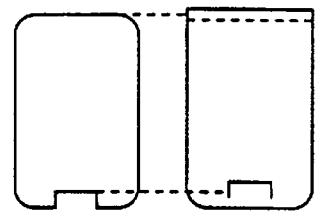
Figure 45:
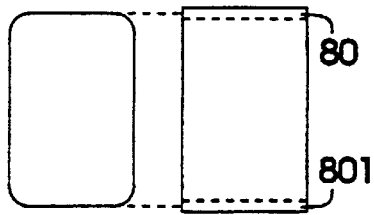
Figure 46:
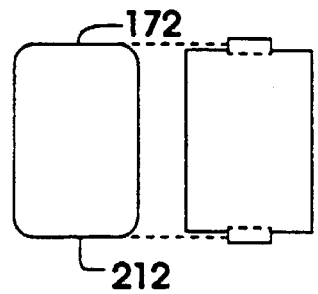
Figure 49:
Figure 50:
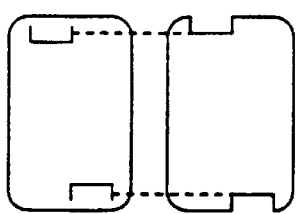
Figure 51:
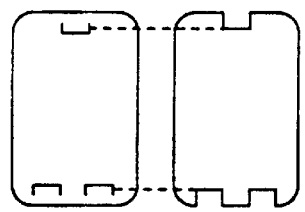
Figure 52:
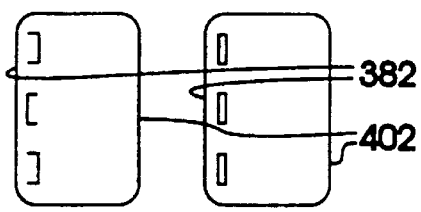
Figure 53:
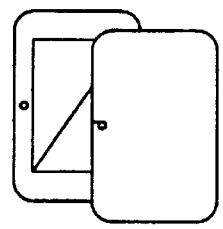
Figure 54:
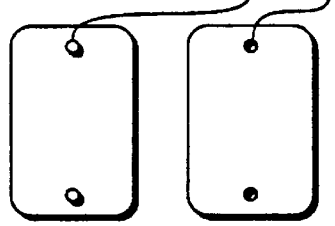

FIG. 39 is in explanation of FIG. 29. FIG. 40 is in explanation of FIG. 30. FIG. 41 shows a variation of the FIG. 30 embodiment in which the internal slot 452 is replaced by an external slot 453. FIG. 42 shows another variation of the FIG. 30 embodiment in which the slot 453 is replaced by a shortening of stiff portion 202 to form a stiff portion 206, acting in the same manner as the edge 21 in FIGS. 27 and 28. FIG. 43 is in explanation of FIG. 31. FIG. 44 shows a variation of the FIG. 31 embodiment, in which the connection means 221 (70, 72) is replaced by a tongue and recess connection means as seen in FIG. 32 but with the tongue on the upper member. FIG. 45 shows another variation of the FIG. 31 embodiment in which the connection means 221 is replaced by a mirror image 801 of the connection means 80. FIG. 46 shows a slight variation of the embodiment of FIG. 45, in which the two connection means 80, 801 are laterally shortened. FIG. 47 shows a slight variation of the embodiment of FIG. 46, in which the edges 173, 213, corresponding to edges 172, 212, are recessed with recesses 47, 49 to accommodate the laterally shortened connection means 802, 803, in the same manner and for the same purpose as the recesses in stiff portion 205, FIG. 32. FIG. 48 shows the end part of a recessed upper or lower stiff portion, showing that the outer edges such as 41, 43 of a recess, e.g. see FIG. 34, can be chamfered as edges 411, 431 to help location of a tongue (or laterally shortened portion such as 802) in any appropriate part of any of the embodiments. FIG. 49 shows an alternative to the variation shown in FIG. 48, in which the projecting portions 422, 442 have become laterally so short that they are simply guiding projections 423, 443 (with or without the chamfer) on the corresponding edge, e.g. 174, of the stiff portion. FIG. 50 shows a variation of the FIG. 32 embodiment, in which the tongues (and their corresponding guide means recesses) are laterally shifted with respect to each other. The same can be applied to any other of the symmetrical arrangements of connection means. FIG. 51 shows a variation of the embodiments mentioned with reference to FIG. 50, in which the connection means at one end is central and there are two oppositely laterally displaced connection means at the opposite end of the stiff portions. It will be realised that, while the vertical (as seen in FIG. 34) set of folds 14 (FIG. 27), 141 is folded first and the horizontal set of folds 16, 161 is folded second, the sheet 12 could be rotated in its own plane by 90° relative to the two stiff portions 18, 20, 185, 205 so that the Z-shaped cross-section of sheet 12 would not be visible in the FIG. 28 cross-section but only in one taken at right angles to that. Alternatively, the opposite connection means 22, 24, FIG. 27, could be at the left and right hand sides (as viewed in FIG. 34) rather than at the top and bottom as actually shown in FIGS. 27 and 34. FIG. 52 shows a further variation in which three connection means for interconnecting the two stiff portions are all placed in the region of the long edges 38, 38, 381, 381, 382, 382, FIGS. 27, 34 and 52, at one side of the stiff portions but pointing in alternate directions. If the folded sheet then has the orientation shown in FIG. 34, the sheet itself provides a degree of connection between the two stiff portions in the region of the edges 40, 40, 401, 401, 402, 402 at their other side, i.e. remote from the three connection means. All four such connections can thus be made suitably for them together to hold the folded sheet means closed. Such an embodiment is not considered to be highly efficient at holding the folded sheet means closed but is very interesting to the user because of the required manipulation, somewhat in the nature of a puzzle, making it highly suitable for use as a promotional item. As seen in FIG. 53, another variation along the lines of the connection means being only at one long edge, there can be provided solely a connection means in the nature of the connection means 522, 523, 53, 662 shown in FIG. 33, the opposite side (right hand side as seen in FIG. 53) of the stiff portions being interconnected by the folded sheet as described above in relation to FIG. 52. FIG. 54 shows a further variation in which two opposite said connection means are provided by press-studs 89 and sockets 90. Either both studs can be on one stiff portion or one stud can be on each, and correspondingly for the sockets.

Figure 55:
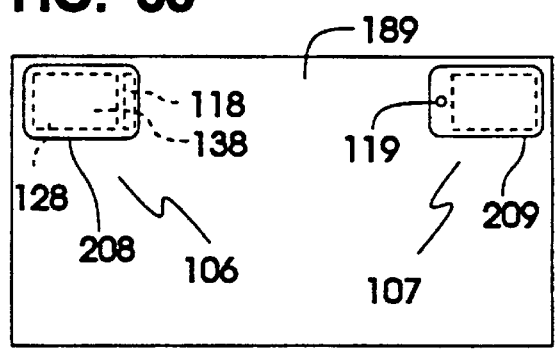
Figure 56:
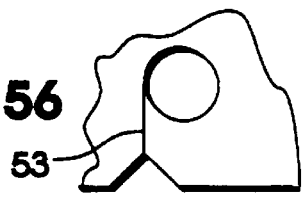

FIG. 55 shows two embodiments of the folded sheet means 106, 107 on a drawing board 189 which acts as the aforementioned lower stiff portion so that it constitutes a modification in which another object (drawing board 189) than the folded sheet means 106, 107 comprises one of the aforementioned stiff portions. The folded sheet 128 has a self-adhesive backing, preferably over the whole of the area of its back segment 138 (comparable to segment 137, FIG. 34), and a front stiff portion 208 which extends (to the right as seen in FIG. 55) beyond the folded sheet and has its own self-adhesive portion 118. Both self-adhesive portions adhere to the drawing board 189. At least the self-adhesive portion 118 is of a releasable, re-usable self-adhesive material that will allow the stiff portion 208 to be released thereby from the drawing board 189 for opening the folded sheet means 106 and then reconnecting them together, repeatedly. The first-mentioned self-adhesive backing to segment 138 may also be similarly repeatedly releasable and engageable. Folded sheet means 107 varies slightly from folded sheet means 106 in that the self-adhesive portion 118 is replaced by a press stud and socket 119 (or any other suitable connection means indicated hereinabove), e.g. the stud being on the drawing board and the socket on the upper stiff portion 209, or vice versa, or again the stud being on a lower stiff portion (attached to the folded sheet and separate from the upper stiff portion 209) which adheres to the drawing board by means of a self-adhesive backing underlying segment 138, which backing may similarly be repeatedly releasable from and engageable with the drawing board.

Figure 57:
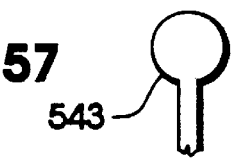

As mentioned above, FIG. 56 shows an enlarged detail of FIG. 33 and FIG. 57 shows an alternative form 543 of the tag 54, FIG. 35.

Figure 58:
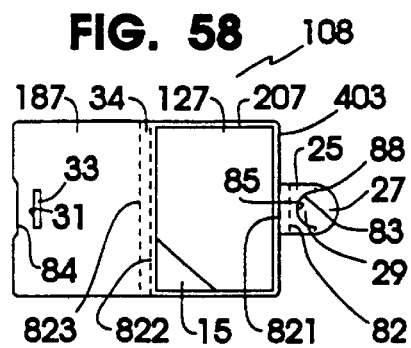

FIGS. 58 to 60 show an embodiment in which the two stiff portions 187, 207 are not separate but monolithic, i.e. formed together as a single piece. In FIG. 58, the four dashed lines 82, 821, 822, 823 are scored, weakened or otherwise adapted for folding. The folded sheet 127 is attached by a corner segment (as 137, FIG. 34) thereof to the back stiff portion 207. The folded sheet means 108 comprises an element 25 that extends from the region of an edge 403 of stiff portion 207 and has a free end 27 and an engaging portion 29. The engaging portion 29 extends back towards said edge 403 in the plane of said element 25. The engaging portion 29 is wholly internal of said element 25, and is preferably formed by making a single cut line 83 during manufacture of the monolithic piece forming stiff portions 187, 207 and spine 34 between them. In use, sheet 127 is folded up completely with both sets of folds and then stiff portion 187 is folded over sheet 127 at fold lines 822, 823 to the position seen in FIG. 59. The element 25 is adapted then to fold over the stiff portion 187 at fold lines 82, 821. The stiff portion 187 being provided with edge 31, the engaging portion 83 can then engage under this edge 31 to provide a releasable connection between the two stiff portions 187, 207, as seen in FIG. 60. To effect the engagement, the free end is bent up (towards the viewer as seen in FIG. 60) slightly and pulled sufficiently to the left (as seen in FIG. 60), which action is facilitated by a recess 84 in the edge of stiff portion 187, for the free end 29 to be inserted through slot 33 and engage under edge 31 to provide a releasable connection between the two stiff portions 187, 207. The extremities of element 25 and engaging portion 29 (i.e. the free end 27 and the leading edge 85 respectively) are rounded to avoid painful jabbing, e.g. when one feels for the folded sheet means 108 in the pocket. The engaging portion 29 then remains in the plane of the element 25, albeit a slightly distorted plane in the FIG. 60 position. The term "plane" has reference to the adjacent parts of the element 25, i.e. beyond fold line 82.

Figure 63:
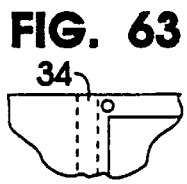
Figure 64:
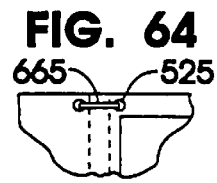

There may be provided grasping means 15 which, as shown in FIG. 58, may be a stiff corner portion with which sheet 127 is provided, or a corner portion bent back or up or curled, or a mere printed indication on sheet 127 that this corner should be grasped, or a stiff portion extending over (and slightly beyond) the whole of folded sheet 127 in the manner of stiff portion 205, FIG. 34. To serve as connection means to a key, key-ring, chain or other connector, there may be provided a hole 524, FIG. 62, e.g. in the spine 34, or in a tag 51, FIG. 61, extending from the spine 34, or adjacent the spine 34 as seen in FIG. 63, or a pair of holes 525, FIG. 64, to either side of spine 34, both of them being threaded by a single ring 665, preferably circular.

In variations of the embodiments of FIGS. 58 to 60 just described, instead of having a spine 34, the two stiff portions may be separate and there may be provided suitably a second connection means of any kind disclosed herein for effecting a connection between the two stiff portions 187, 207.

Figure 65:
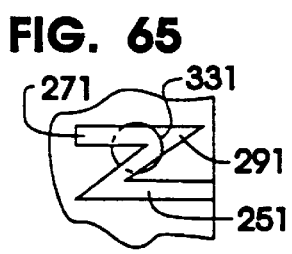
Figure 66:
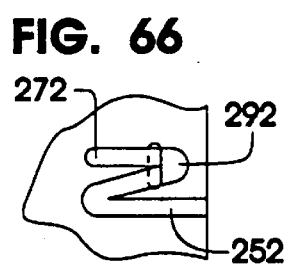
Figure 67:
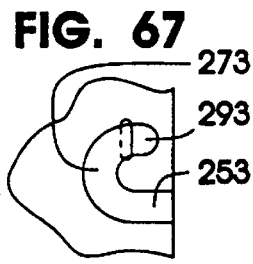

As seen in FIGS. 65 to 67, the element 251, 252, 253 may alternatively have a Z or C shape. In use, it is distorted by pulling its free end 271, 272, 273 to the left (as seen in FIGS. 65 to 67) to engage its engaging portion 291, 292, 293 under the engaging edge 31 of the stiff portion 187 and to release it therefrom. The engaging edge may, for example, be provided by a round hole 331 alternatively to the slot 33.

Figure 68:
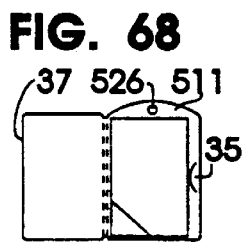
Figures 69, 70:
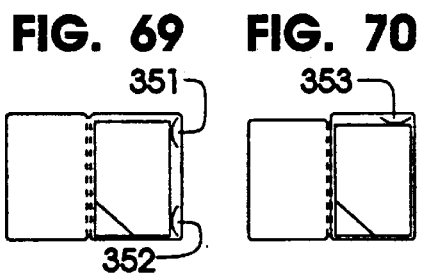

FIG. 68 shows a variation of the FIG. 58 embodiment in which the connection means 25, 33 is replaced by a simple cut-out 35, which engages over edge 37. (There may be provided an extension 511 with a hole 526.) FIG. 69 shows use of two such connection means 351, 352. FIG. 70 shows use of cut-out 353 on the top edge and towards one corner, away from the spine 34.

FIG. 71 shows an alternative connection means 39 particularly suitable for use at a corner opposite spine 34. If required, a second such connection means 39 can be provided at the other corner opposite spine 34. The connection means 39 comprises, in one of the stiff portions (the front one as viewed in FIG. 71), a feature of a corner cut out more or less square and in the other stiff portion (the back one as viewed in FIG. 71) an L-shaped cut 86 to enable the resulting end portion 294 to engage over an edge 87 of the cut corner. A difficulty of this embodiment (and some of the others) is that the sheet when folded has to be of reduced length and/or breadth in order to avoid fouling the connection means 39. To avoid this difficulty, both coners of a connection means 39 can be extended outwardly to form a connection means 391. This can be done in various ways. In the example of means 391 actually shown, the L-shaped cut 86 has become a straight line cut 861. These cuts 86, 861 (as elsewhere, e.g. cut 83, FIG. 58) may be provided with a curl 88, 881, 882 to facilitate the necessary distortion of the connection means when fastening the same. This form of connection means 391 may not be acceptable if, for example, the extensions are likely to catch in the pocket.

In all the embodiments, any corner/s can be rounded to help avoid injury, e.g. when the embodiment is used in the pocket, e.g. due to a sharp corner going up under a fingernail and any of the connection means can be used in any of the positions, as appropriate.

Figures 75, 76:
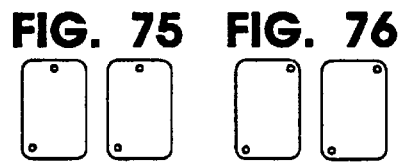
Figure 77:
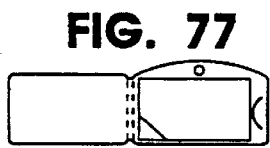

FIG. 72 shows a variation of the FIG. 54 embodiment, in which the two connection means, each comprising press stud 891 and corresponding socket 901 are located near to adjacent edges instead of two opposite edges of each stiff portion as in FIG. 54. Also, as another variation, the sheet 125 is fixed to the back of the back (left hand as seen in FIG. 72) stiff portion 188 but folds in front of it so that, when folded, the sheet 125 extends outside the other two adjacent edges 91, 92, i.e. the edges that are free of connection means, as can be seen by the positioning of its fold lines 142, 162. FIG. 73 shows a cross-section (not to scale) along the line 47—47 when the folded sheet means is completely folded up. Most of the embodiments described herein can be provided with their connection means on two adjacent edges. These and the FIG. 53 embodiment leave at least two adjacent edges free of connection means. In such a case a back-affixed sheet of the FIG. 72 kind can be used. This allows use of a larger sheet than one wholly between the stiff portions, which may have to be further reduced in width and/or length to clear the connection means. An exception to the requirement of two adjacent edges free of connection means is illustrated by the sheet 124 shown in dashed lines in FIG. 43, as a variation to the above-described embodiment of FIGS. 31 and 43. This is shown schematically in cross-section in FIG. 74 (not to scale). Because of the hook-over nature of connection means 80, this can hook over the folded sheet 124 and the stiff portion 184, now inside sheet 124. This FIG. 43 embodiment opens upwardly (as seen in FIG. 43) in contrast to the FIG. 34 embodiment which opens downwardly, but can be made to open similarly to the FIG. 34 embodiment by a rearrangement of the parts, e.g. of the stiff portions 184, 204 on the sheet 124, and possibly of the folding. Rearrangement of the parts, differently folding the sheet, left handed opening e.g. for left handed people, landscape orientation instead of portrait, and other possibilities, can be applied to any of the embodiments described herein, e.g. as indicated in FIGS. 75 and 76, being variations of the FIG. 72 embodiment (with the press-stud and socket means being located in the region of the middle of one side and in the region of the far corner of an adjacent side and being located in the region of two diagonally opposite coners, respectively in the two embodiments), and as indicated in FIG. 77, being a variation of the FIG. 68 embodiment in that it comprises a landscape arrangement.

It will be apparent to one skilled in the art, that features of the different embodiments disclosed herein may be omitted, selected, combined or exchanged and the invention is considered to extend to any new and inventive feature or combination of features thus formed or herein disclosed.

In the accompanying claims, the numeral references are given only by way of example.

What is claimed is:

1. Folded sheet means ($20^1$, 10) comprising a sheet ($22^1$, 12) of foldable, writable material with a first set of concertina folds ($26^1$, 14) and a second set of folds ($28^1$, 16) transverse to the first set, at which folds ($26^1, 28^1, 14, 16$) the sheet ($22^1$, 12) can be folded and unfolded, characterized in that the sheet means ($20^1$, 10) includes a holding means ($24^1$, 22, 24) releasably holding the folded sheet means folded, and the folded sheet means ($20^1$, 10) further comprises a connection means ($106^1$, 52) releasably connecting the folded sheet means ($20^1$, 10) or the holding means ($24^1$, 22, 24) to another object in which the connection means ($106^1$ 52) is an integral part of the folded sheet means ($20^1$, 10) or the holding means ($24^1$, 22, 24).

2. Means as claimed in claim 1, characterized in that the second set of folds consists of a set of concertina folds ($26^1$, 14).

3. Means as claimed in claim 1, characterized in that said holding means comprises container ($24^1$), said container ($24^1$) retains said sheet ($22^1$, 12) therein for releasably holding the folded sheet means ($20^1$) folded.

4. Means as claimed in claim 3, characterized in that said container ($24^1$) retains said sheet ($22^1$) with the aid of friction and/or at least one mechanical retaining portion ($71^1$) of the container ($24^1$) and/or springiness of the sheet ($22^1$) when folded up due to its mutually transverse set of folds.

5. Means as claimed in claim 3, characterized in that the container ($24^1$) has an open end ($32^1$) and a cut-out shape at the open end ($32^1$) to facilitate grasping and withdrawing from it the folded sheet ($22^1$).

6. Means as claimed in claim 3, characterized in that the container ($24^1$) has at least one inwardly directed lip ($34^1$) to facilitate retaining the folded sheet therein.

7. Means as claimed in claim 3, characterized in that said holding means includes a carrier ($96^1$) for the folded sheet material ($22^1$), the carrier ($96^1$) being movable into and out from the container ($24^1$).

8. Means as claimed in claim 7, characterized in that the folded sheet ($22^1$) is removable from the carrier ($96^1$).

9. Means as claimed in claim 7, characterized in that said holding means comprises means ($108^1$) to limit the extent of relative withdrawal of the carrier ($96^1$) from the container ($24^1$).

10. Means as claimed in claim 7, characterized in that said connection means is provided by a tail (106$^1$) suitable for connection to a key ring or luggage which tail (106$^1$) is connected to said carrier (96$^1$).

11. Means as claimed in claim 3, characterized in that said sheet (22$^1$) is provided with a stiff portion (54$^1$) which stiff portion (54$^1$) is in the region of a corner of the sheet (22$^1$) when the sheet (22$^1$) is unfolded and said stiff portion (54$^1$) is provided by container (24$^1$).

12. Means as claimed in claim 3, characterized in that the container (24$^1$) comprises two flaps (40$^1$, 42$^1$) hinged together and releasably fastened together about the folded sheet (22$^1$, 12).

13. Means as claimed in claim 1, characterized in that the sheet (12) is provided with a stiff portion (18) which is in the region of a corner of the sheet (12) when the sheet (12) is unfolded, and said holding means comprise a releasable connection (22) for said stiff portion (18) releasably holding the folded sheet means (10) folded.

14. Means as claimed in claim 1, characterized in that the sheet (12) is provided with two stiff portions (18, 20) which are in the region of diagonally opposite corners respectively of the sheet (12) when it is unfolded, and said holding means comprises a releasable connection (22) between said two stiff portions (18, 20) to serve for releasably holding the folded sheet means (10) folded.

15. Means as claimed in claim 13 or 14, characterized in that said holding means comprise two of said releasable connections (22, 24), which together can releasably hold said folded sheet means (10) folded.

16. Means as claimed in claim 15, characterized in that the two said releasable connections (22, 24) are in the region of opposite edges (21, 17) of the folded sheet means (10) when folded.

17. Means as claimed in claim 15, characterized in that each of the two said releasable connections (22, 24) comprises a tongue (26, 28), both tongues (26, 28) extending from one of said stiff portions (18) inwardly thereof in opposite directions.

18. Means as claimed in claim 1, characterized in that part or all of the connection means (522, 523, 662) are provided in common with part or all of the holding means (522, 523, 662).

19. Means as claimed in claim 18, characterized in that the common means comprise a tongue (264) to provide a connection loop (64).

20. Means as claimed in claim 1, characterized in that the folded sheet means (20$^1$, 10) is substantially one-half or one-third of credit card size (8.5 cm by 5.35 cm or 3.3 in by 2.15 in) ±20%.

21. Means as claimed in claim 1 or 2, characterized in that the sheet (128) is provided with a stiff portion (208) arranged to lie on one side of the sheet (128) when it is folded with both sets of folds, and said connection means (118, 138) are adapted to serve for at least two releasable connections (118, 138) between the folded sheet means (10) and said other object (189), when that object (189) is arranged to lie on the opposite side of the folded sheet (128) thus folded.

22. Means as claimed in claim 1 or 2, characterized in that the folded sheet means (10) has back portion (138) provided with a releasable self-adhesive material for attaching the sheet means (10) to a holding surface and a front portion (208) for grasping and opening the sheet (12).

23. Means as claimed in claim 3, characterized in that said container is an envelope.

24. Folded sheet means (20$^1$, 10) comprising a sheet (22$^1$, 12) of foldable, writable material with a first set of concertina folds (26$^1$, 14) and a second set of concertina folds (28$^1$, 16) transverse to the first set of folds, at which folds (26$^1$, 28$^1$, 14, 16) the sheet (22$^1$, 12) can be folded and unfolded, the sheet means including a holding means (24$^1$, 22, 24) releasably holding the folded sheet (22$^1$, 12) folded, and the sheet means (20$^1$, 10) further including an integrated connection means (106$^1$, 52) releasably connecting the folded sheet means (20$^1$, 10) or the holding means (24$^1$, 22, 24) to another object, part or all of the connection means being provided in common with part or all of the holding means and the common means comprising a tongue (264) to provide a connection loop (64).

\* \* \* \* \*